(12) United States Patent
Kasako et al.

(10) Patent No.: US 8,438,403 B2
(45) Date of Patent: May 7, 2013

(54) STORAGE APPARATUS

(75) Inventors: Naohisa Kasako, Odawara (JP); Misako Tamura, Atami (JP); Sachiko Hinata, Odawara (JP)

(73) Assignee: Hitachi, Ltd., Tokyo (JP)

( * ) Notice: Subject to any disclaimer, the term of this patent is extended or adjusted under 35 U.S.C. 154(b) by 1188 days.

(21) Appl. No.: 12/010,357

(22) Filed: Jan. 24, 2008

(65) Prior Publication Data
US 2008/0229118 A1 Sep. 18, 2008

(30) Foreign Application Priority Data
Mar. 16, 2007 (JP) .................................. 2007-069483

(51) Int. Cl.
H04L 29/06 (2006.01)
(52) U.S. Cl.
USPC ............................... 713/193; 713/189; 726/26
(58) Field of Classification Search .................. 713/189, 713/193; 726/26
See application file for complete search history.

(56) References Cited

U.S. PATENT DOCUMENTS

| | | | | |
|---|---|---|---|---|
| 6,366,117 B1* | 4/2002 | Pang et al. | ........................ | 326/38 |
| 6,463,509 B1* | 10/2002 | Teoman et al. | ................ | 711/137 |
| 2004/0049700 A1* | 3/2004 | Yoshida | ......................... | 713/201 |
| 2005/0005091 A1* | 1/2005 | Suzuki | ............................. | 713/150 |
| 2005/0081048 A1* | 4/2005 | Komarla et al. | ............... | 713/193 |
| 2006/0064604 A1* | 3/2006 | Osaki | .............................. | 713/193 |
| 2006/0182281 A1* | 8/2006 | Taguchi et al. | ................. | 380/270 |
| 2006/0195704 A1 | 8/2006 | Cochran et al. | | |
| 2007/0180239 A1 | 8/2007 | Fujibayashi et al. | | |
| 2008/0092029 A1* | 4/2008 | Arakawa et al. | ............... | 714/801 |
| 2010/0042832 A1 | 2/2010 | Fujibayashi et al. | | |

FOREIGN PATENT DOCUMENTS

| | | |
|---|---|---|
| JP | 55-32074 | 3/1980 |
| JP | 2006-227839 | 2/2005 |
| JP | 2007-028502 | 2/2007 |

OTHER PUBLICATIONS

European Patent Office extended search report on application No. 08250170.1 dated Sep. 16, 2011; 6 pages.

* cited by examiner

*Primary Examiner* — Jason Gee
(74) *Attorney, Agent, or Firm* — Foley & Lardner LLP

(57) ABSTRACT

Provided is a storage apparatus capable of encrypting data without affecting the business performance. This storage apparatus includes a cache memory, a first controller for controlling the writing of data in the cache memory pursuant to the write command, a second controller for controlling the writing of the data written in the cache into the storage devices, and an encryption engine for encrypting data pursuant to the write command. When the second controller reads the data from the cache memory and writes the data in said storage devices, the encryption engine encrypts the data, and the second controller writes the encrypted data in said storage devices.

14 Claims, 36 Drawing Sheets

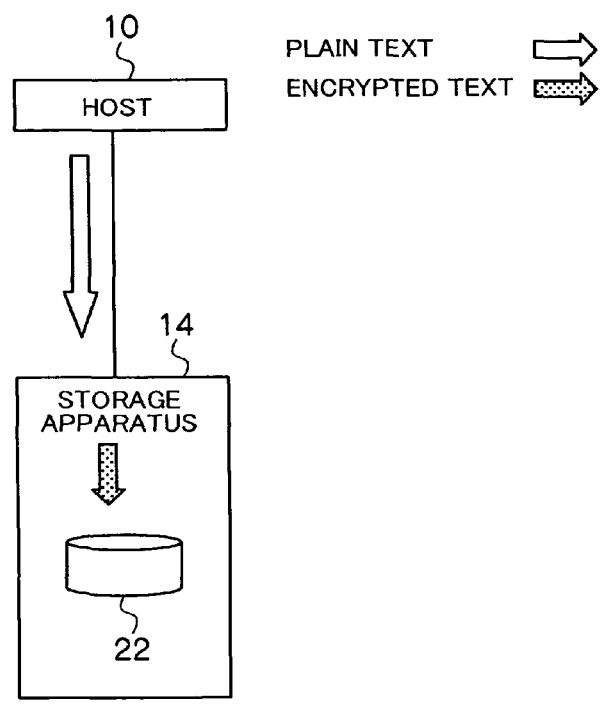

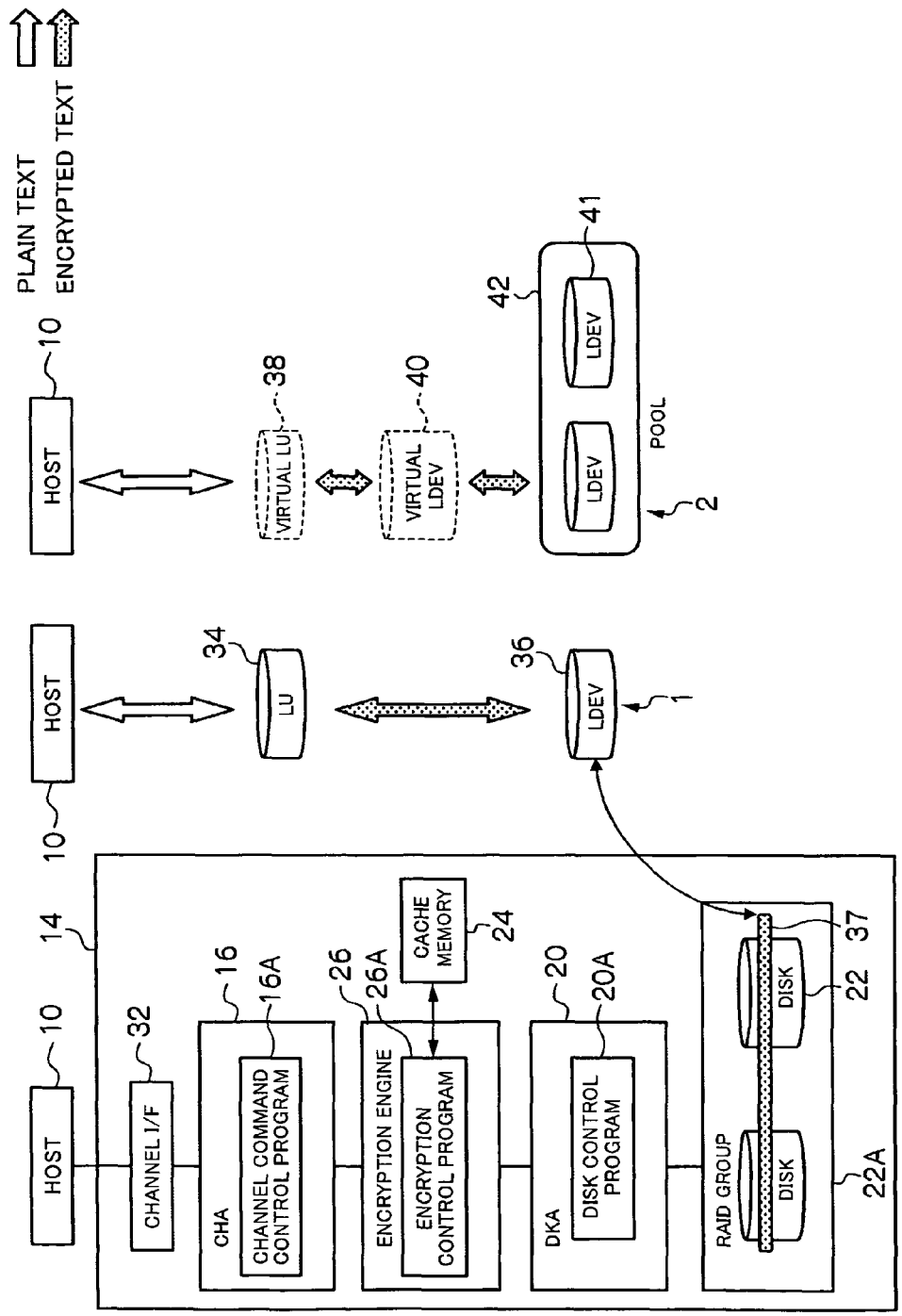

FIG.4A
ENCRYPTED GROUP MANAGEMENT TABLE

| ENCRYPTED GROUP NUMBER | LDEV NUMBER LIST | CURRENT KEY | BACKUP KEY |
|---|---|---|---|
| 1 | #1 | Key2 | Key1 |
| 2 | 4, 5 | Key3 | 0 |

FIG.4B
VIRTUAL LDEV MANAGEMENT TABLE

| VIRTUAL LDEV NUMBER | ENCRYPTED BIT | POOL NUMBER | POOL LDEV NUMBER LIST |
|---|---|---|---|
| 1 | 1 | 1 | 1, 2 |
| 2 | 0 | 2 | 3 |

FIG.4C
MAPPING MANAGEMENT TABLE

VIRTUAL LDEV NUMBER 1

| VIRTUAL ADDRESS | POOL LDEV NUMBER | REAL ADDRESS |
|---|---|---|
| 1 | 1 | 0 |
| 4 | 1 | 1 |

FIG.4D
LDEV MANAGEMENT TABLE

| LDEV NUMBER | 0 | 1 | 2 | 3 | 4 | 5 |
|---|---|---|---|---|---|---|
| ENCRYPTED BIT | 0 | 1 | 1 | 0 | 1 | 1 |
| POOL USED BIT | 0 | 1 | 1 | 1 | 0 | 0 |

FIG.4E
POOL MANAGEMENT TABLE

LDEV NUMBER 1

| ADDRESS NUMBER | 0 | 1 | 2 | 3 | 4 | 5 | 6 |
|---|---|---|---|---|---|---|---|
| ALLOCATED BIT | 1 | 1 | 0 | 0 | 0 | 0 | 0 |

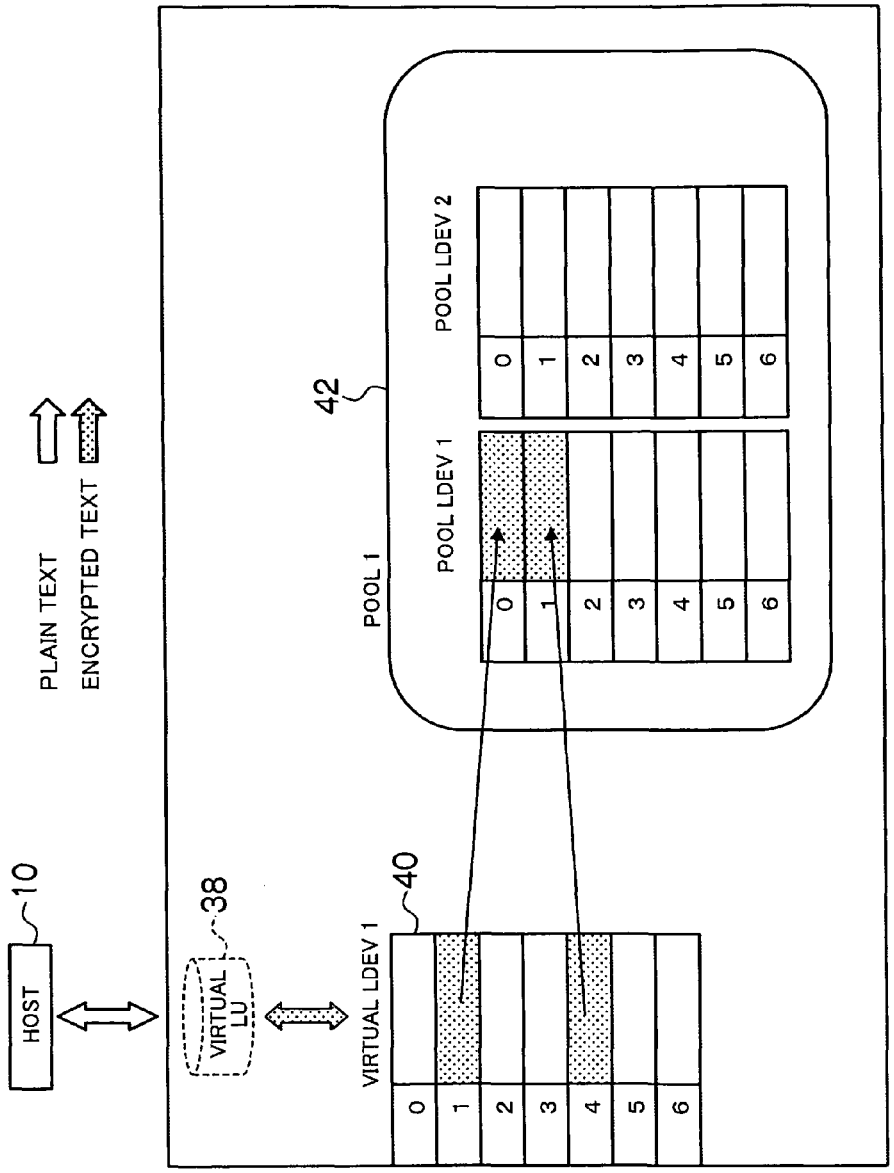

FIG.10A
PAIR MANAGEMENT TABLE

| PAIR NUMBER | PRIMARY LDEV NUMBER | SECONDARY LDEV NUMBER | PAIR STATUS |
|---|---|---|---|
| 1 | #1 | #3 | COPY |
| 2 | 0 | 0 | SIMPLEX |

FIG.10B
VIRTUAL LDEV MANAGEMENT TABLE

| VIRTUAL LDEV NUMBER | ENCRYPTED BIT | POOL NUMBER | POOL LDEV NUMBER LIST | VOL STATUS |
|---|---|---|---|---|
| 1 | 1 | 1 | 1, 2 | PVOL |
| 2 | 0 | 2 | 3 | SIMPLEX |
| 3 | 1 | 1 | 1, 2 | SVOL |

FIG.10C
MAPPING MANAGEMENT TABLE

| VIRTUAL LDEV NUMBER 1 | | |
|---|---|---|
| VIRTUAL ADDRESS | POOL LDEV NUMBER | REAL ADDRESS |
| 1 | 1 | 0 |
| 4 | 1 | 1 |

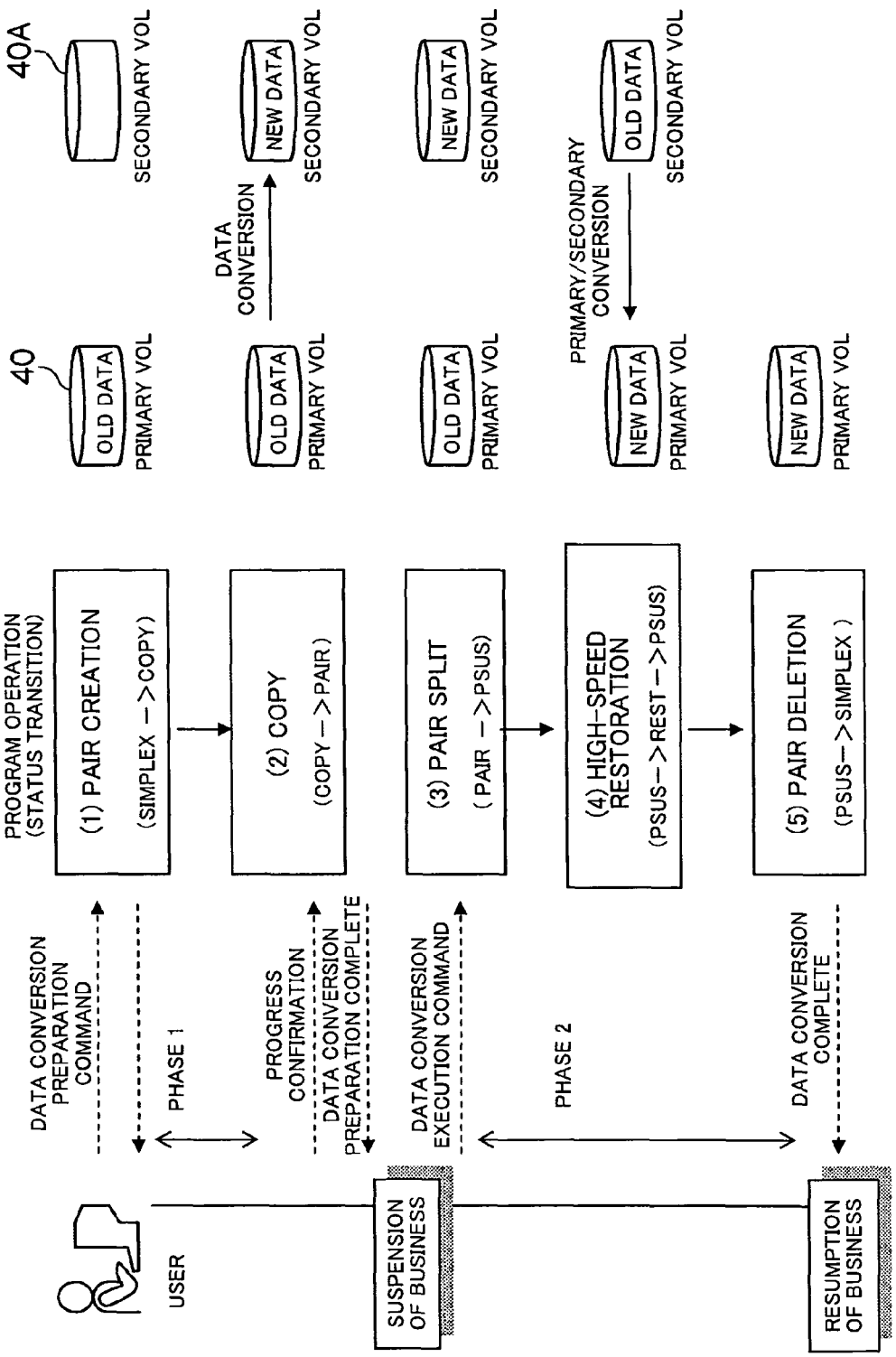

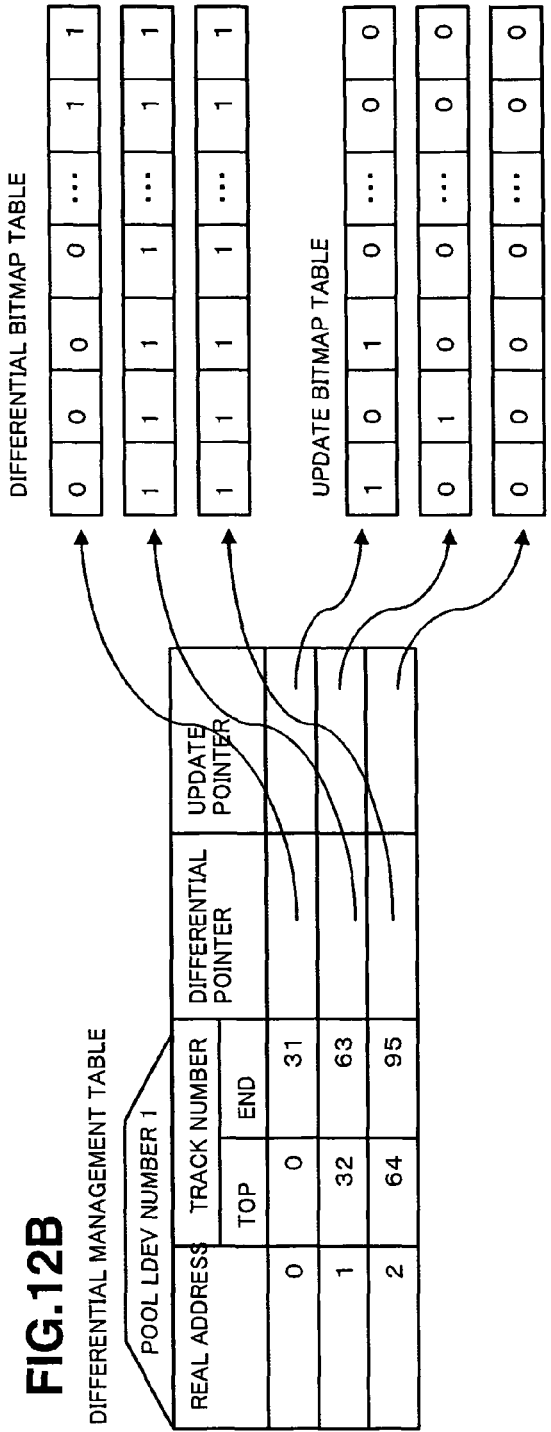

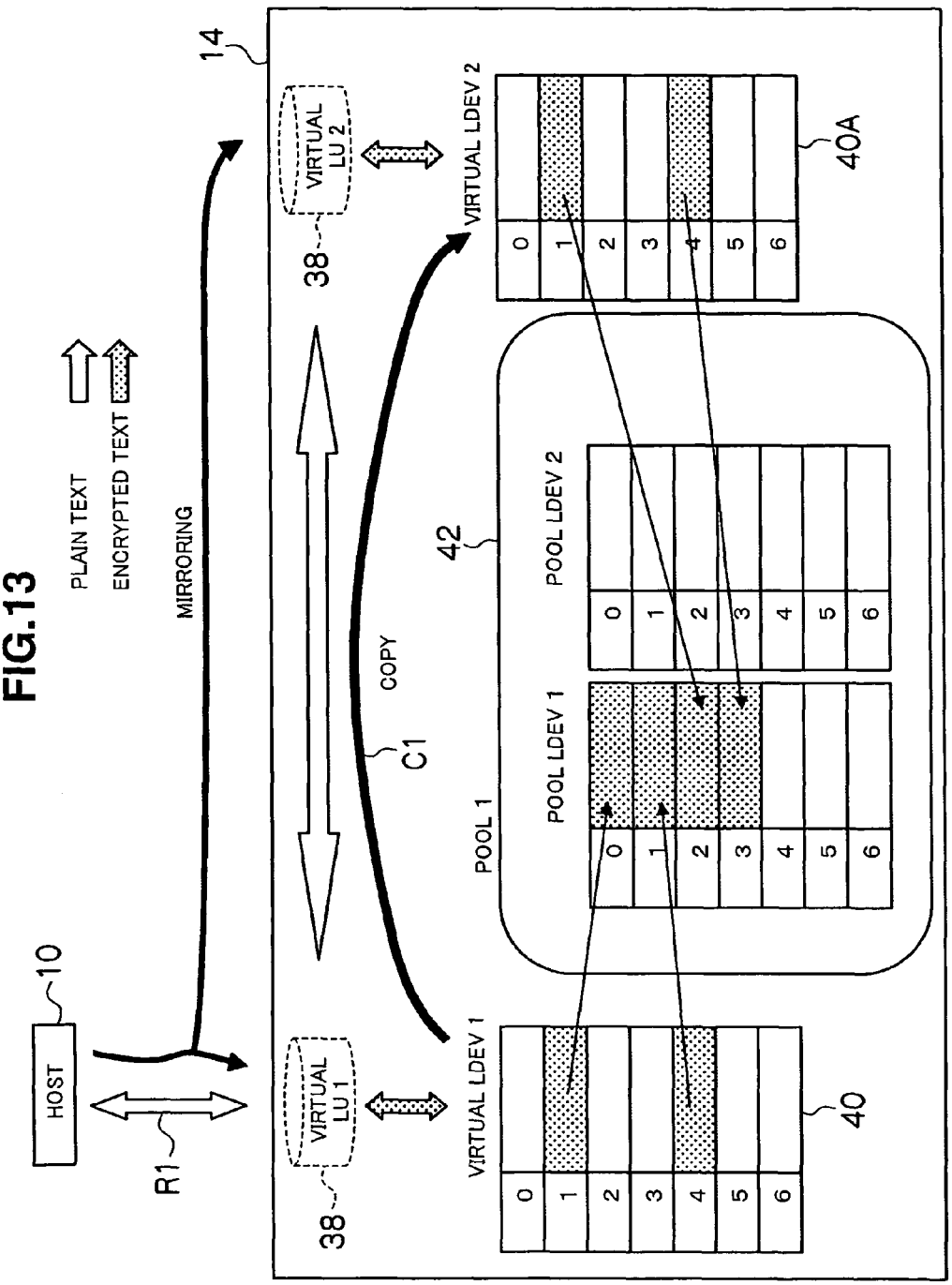

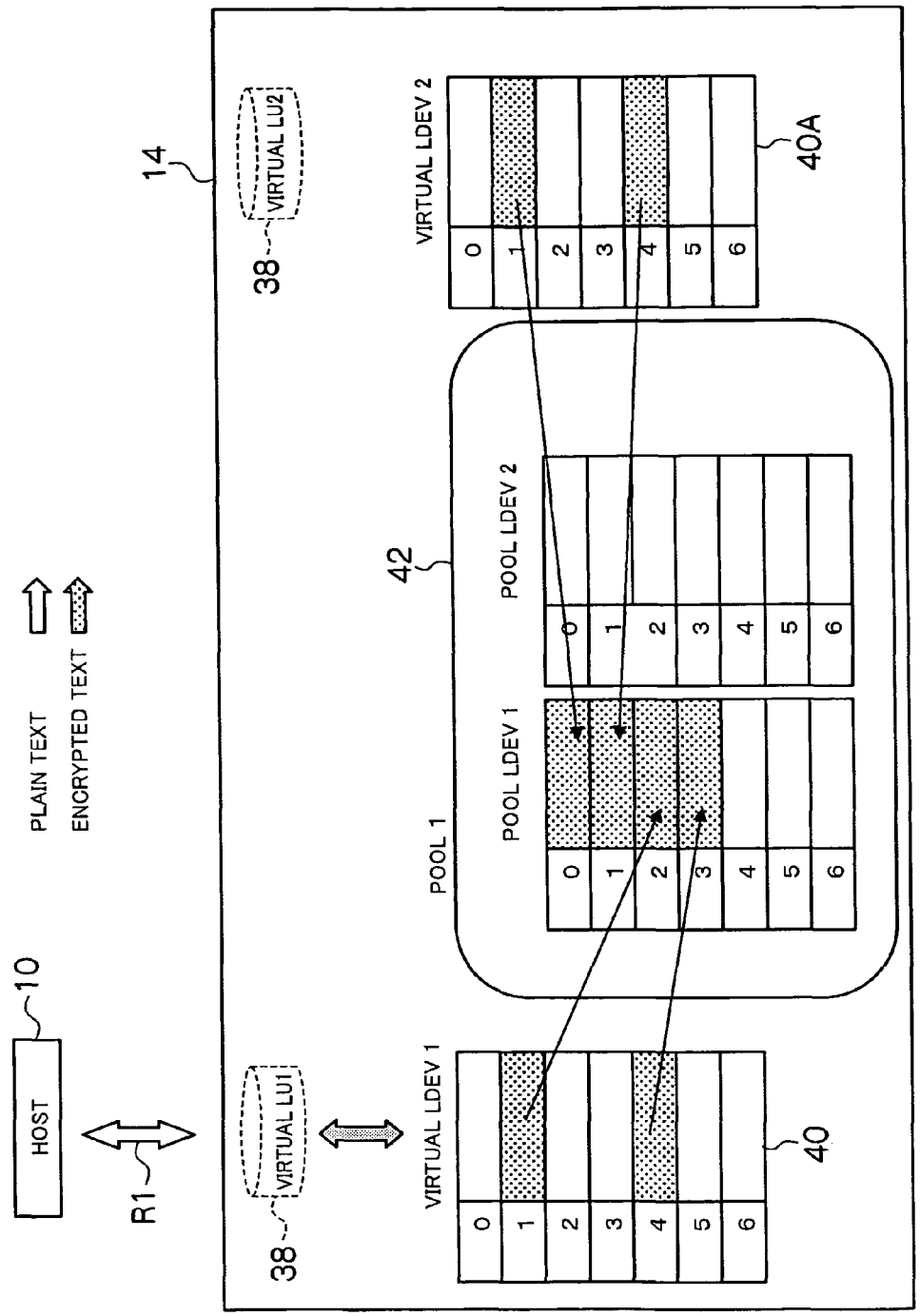

STORAGE APPARATUS

CROSS REFERENCES

This application relates to and claims priority from Japanese Patent Application No. 2007-069483, filed on Mar. 16, 2007, the entire disclosure of which is incorporated herein by reference.

BACKGROUND

The present invention generally relates to a storage apparatus, and in particular to a storage apparatus comprising an encryption engine that encrypts data sent from a host and stores it in a storage device, and decrypts the encrypted data stored in the storage device and sends it to the host, and to the control method of such a storage apparatus.

A storage apparatus is known as a special device for providing a large-capacity storage resource to a host computer or a host system. This storage apparatus is also known as a storage subsystem or a storage controller, and is configured by comprising a plurality of storage devices, and a controller for controlling the input and output of data between the storage device and the host according to a write access or a read access from the host.

In recent years, from demands for ensuring the security of data, it is necessary to improve the confidentiality of data to be written in the storage apparatus. As methods of encrypting the data to be written in the storage apparatus, there is a method where the host personally encrypts the data, a method of disposing an encryption engine on a network connecting the host and the storage apparatus, and a method of the storage apparatus personally comprising the encryption engine.

As conventional technology pertaining to a mode where the storage apparatus comprises the encryption engine, for instance, there is a storage system described in Japanese Patent Laid-Open Publication No. H2006-227839 (Patent Document 1).

This storage system aims to simplify the decryption process of encrypted data when migrating such encrypted data to a different encryption engine, maintain security to prevent tapping and falsification when rewriting the calculation method of encrypted data into a different calculation method, and improve the access performance. FIG. 3 of Patent Document 1 illustrates a storage system 100 accessible from a host computer comprising a storage apparatus including a data area 120. In this storage system 100, when a storage apparatus comprising a scheme capable of decrypting encrypted data is selected as the migration destination of such encrypted data, it is possible to continue retaining such encrypted data in a reliable manner even when the device or code calculation method becomes obsolete by updating the code calculation method applied in migrating data or decoding encrypted data with a different method based on internal processing of the device, and re-storing such method.

SUMMARY

To begin with, since data stored in a storage apparatus is distributed to a plurality of hard disk drives according to a RAID configuration, confidentiality of the information resource in the storage apparatus is consequently guaranteed to a certain degree.

Although data is distributed to a plurality of storage devices in RAID, since the data itself is not subject to any confidentiality measure, there is significance in equipping the storage apparatus with an encryption engine.

Nevertheless, when equipping the storage apparatus with such encryption engine, there is room for much improvement such as in the timing of encrypting the data sent from the host system to the storage apparatus.

In addition, as a method of improving the confidentiality of the storage apparatus, there is technology known as re-key of periodically replacing an old encryption key with a new encryption key upon determining the lifetime of the encryption key. Meanwhile, during the implementation of the re-key process, since the encrypted data of the storage apparatus is encrypted with two or more types of encryption keys, the host will not be able to read the data in the storage apparatus. Thus, it is necessary to decrypt all data with the old key, and thereafter re-encrypt such data with a new key. During this period, however, there is a problem in that this process will affect the online business of the host system.

Thus, an object of the present invention is to provide a storage apparatus capable of encrypting data without affecting the business performance. Another object of the present invention is to provide a storage apparatus that will not affect the online operation with a host system even during encryption processing of re-encrypting data, which was encrypted with an old encryption key, with a new encryption key, or be subject to restrictions such as needing to allocate considerable storage resources to such encryption processing.

In order to achieve the foregoing objects, the present invention provides a storage apparatus connected to a host system and which controls the writing of data in a storage device in response to a write command from the host system, and further controls the reading of data from the storage device in response to a read command from the host system. This storage apparatus comprises a cache memory, a first controller for controlling the writing of data in the cache memory pursuant to the write command, a second controller for controlling the writing of the data written in the cache into the storage device, and an encryption engine for encrypting data pursuant to the write command. When the second controller reads the data from the cache memory and writes the data in the storage device, the encryption engine encrypts the data, and the second controller writes the encrypted data in the storage device.

The present invention additionally provides a storage apparatus for controlling the input and output of data between a host system and a storage area of a storage device. This storage apparatus comprises a first volume, a first controller for storing write data from the host system into the first volume, an encryption engine for encrypting the write data, a second volume, a second controller for storing the encrypted write data into the second volume, and a third controller for restoring the encrypted write data of the second volume into the first volume.

The present invention further provides a storage apparatus for controlling the input and output of data between a host system and a storage area of a storage device. This storage apparatus comprises a controller for processing a write access from the host system, an encryption unit for creating encrypted data based on write data from the host system, a memory for storing an encryption key used by the encryption unit upon encrypting the write data, a first volume to which the encrypted data is written, and a second volume to which encrypted data stored in the first volume and subject to re-key processing is written. The controller receives a write access from the host system to the first volume during the re-key processing, stores encrypted data configured from encrypted written data in an access-target area, reads the encryption key from the memory, and decrypts the encrypted data stored in the access-target area using the encryption key.

Accordingly, the present invention is able to provide a storage apparatus capable of encrypting data without affecting the business performance, in particular, provide a storage apparatus that will not affect the online operation with a host system even during encryption processing of re-encrypting data, which was encrypted with an old encryption key, with a new encryption key, or be subject to restrictions such as needing to allocate considerable storage resources to such encryption processing.

DESCRIPTION OF DRAWINGS

FIG. 2 is a block diagram showing that the storage apparatus has an encryption engine, and encrypts non-encrypted data sent from a host;

FIG. 3 is a functional block diagram showing the hierarchical relationship of the storage apparatus pertaining to the present invention, and a logical volume;

FIG. 4A to FIG. 4E are a plurality of management tables for managing the logical volume;

FIG. 5 is a mapping diagram showing the correspondence of a virtual LDEV and a pool LDEV;

FIG. 10A to FIG. 10C are a plurality of management tables for managing a plurality of logical volume in a pair relationship;

FIG. 11 is a block diagram showing the re-key process between logical volumes in a pair relationship, and the transition of the respective steps for performing such re-key;

FIG. 12A and FIG. 12B are a plurality of management tables for managing the copy process between logical volumes in a pair relationship;

FIG. 13 is a block diagram showing the copy operation of encrypted data between a plurality of volumes;

FIG. 14 is a block diagram showing the operation for restoring the encrypted data to a primary volume in FIG. 13;

DETAILED DESCRIPTION

Figure 1:
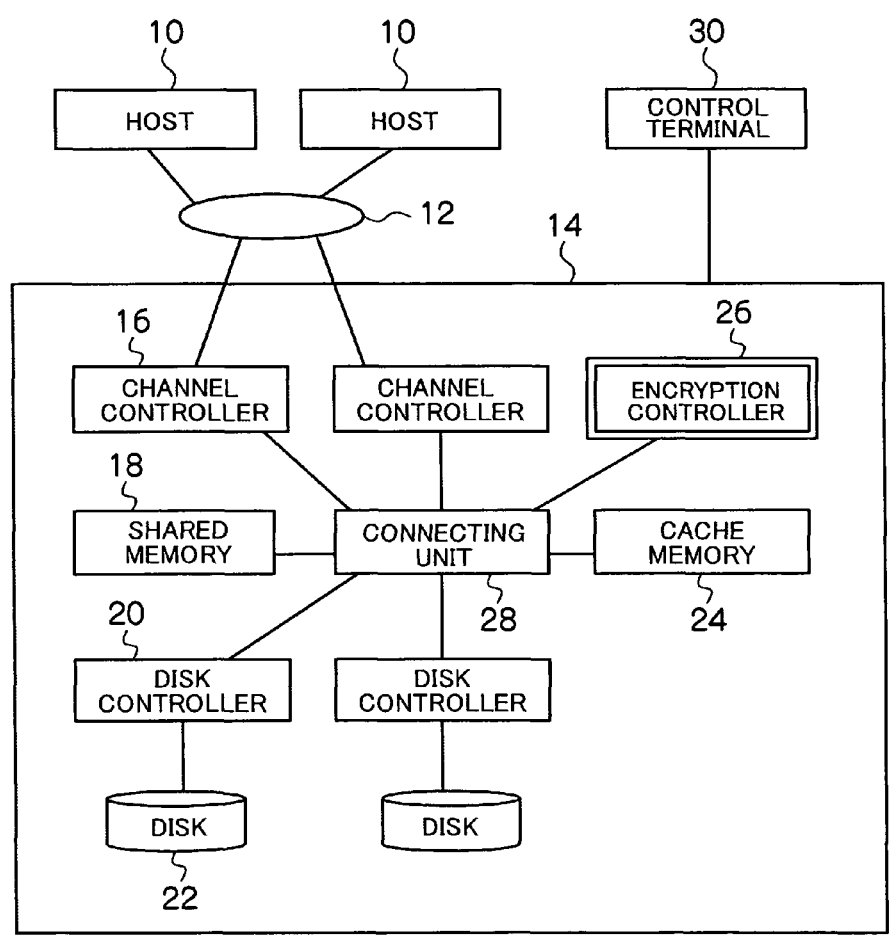
FIG. 1 is a hardware block diagram showing an embodiment of a storage apparatus according to the present invention.

Embodiments of the present invention are now explained. FIG. 1 shows a hardware block of an embodiment of a storage apparatus according to this invention. The storage apparatus 14 is connected to a host 10 via a network 12. The storage apparatus 14 comprises a channel controller 16, a disk controller 20, a shared memory 18 storing control information and management tables, a cache memory 24 for temporarily storing write data input from the host and read data to be output to the host, an encryption controller 26 for encrypting write data and decrypting read data, and a controller 28 connected to the channel controller 16, the shared memory 18, the disk controller 20, the cache memory 24, and the encryption controller 26, and which enables the data transfer among the foregoing elements.

The storage apparatus 14 is connected to a control terminal 30 that controls the volumes of the storage apparatus 14, and sets and updates tables in the shared memory 18.

The channel controller 16 communicates with the host 10 using a fibre channel protocol or an Internet protocol, and sends and receives data to and from the host upon receiving a data I/O request from the host. The disk controller 20 is communicably connected to a hard disk drive unit 22 as a storage device, and controls such hard disk drive unit. The hard disk drive unit corresponds to a storage device, but the storage device is not limited to a hard disk drive unit, and a publicly-known semiconductor memory such as a flash memory may also be used.

Since the storage apparatus 14 comprises the encryption controller 26, as shown in FIG. 2, data not subject to encryption processing sent from the host 10 is encrypted in the storage apparatus 14, and then stored in the hard disk drive unit 14. Like this, the host 10 is able to carry on its business without having to give any consideration to encryption. Incidentally, non-encrypted data is hereinafter generally referred to as plain text, and data encrypted with an encryption key is hereinafter generally referred to as encrypted text.

FIG. 3 is a block diagram focusing on the correspondence of the host and a logical volume in the storage apparatus. The storage apparatus 14 is connected to the host 10 via a channel interface 32. A channel command control program 16A of the channel controller 16 analyzes commands from the host and sends and receives data.

The encryption engine 26 as the encryption controller uses an encryption control program to encrypt data when plain text is destaged from the cache memory 24 to the storage device 22, and decrypts the encrypted text when such encrypted text is staged from the storage device to the cache memory 24.

A disk control program of the disk controller 20 controls the writing of data in the hard disk drive unit 22, or controls the reading of data from the hard disk drive unit 22.

Reference numeral 1 is the first mode showing the relationship of the host and the logical volume. The host 10 recognizes a logical volume (LU) 34 and accesses the storage apparatus 14. A logical volume (LDEV) 36 is able to recognize that the storage apparatus 14 corresponds to the LU 34.

The channel command control program 16A and the disk control program 20A converts the host I/O access to the LU 34 into an access to the LDEV 36 so as to enable the host I/O to access the storage area allocated to the LDEV 36.

A physical storage area is allocated from the hard disk drive unit 22 to the LDEV 36. The storage area allocated to the LDEV 36 is distributed to a plurality of disk devices, and configured based on a RAID system. A RAID group 37 is an aggregate of physical storage areas configured from a RAID system and existing across a plurality of disk devices, and one or more RAID groups correspond to an LDEV.

Access from the host 10 to the LU 34 is based on plain text, and the storage apparatus 14 encrypts the plain text and writes it in the LDEV 36. Since the host is able to access the storage apparatus for inputting and outputting data without having to give consideration to encryption, the host is able to continue business efficiently without being burdened for encryption.

Reference numeral 2 shows a mode where the allocation of a real storage area to the logical volume is different from the case shown in reference numeral 1. In the mode of reference numeral 1, a relatively large capacity is fixedly allocated to the storage area from the beginning so as to deal with the access from the host 10.

Contrarily, the mode of reference numeral 2 uses a virtual LU 38 and a virtual LDEV 40, and these logical volumes are virtual volumes to which a real storage area is not fixedly allocated. The storage apparatus sequentially allocates a real storage area to the virtual LDEV according to the write access from the host. In other words, the virtual LDEV 40 is not fixedly allocated with large-capacity storage area from the beginning as with the real LDEV 36, and the capacity of the storage area to be sequentially allocated according to the access to the virtual LDEV, such as the write access from the host, is increased. Thus, it is possible to effectively use the storage resource of the storage apparatus. Incidentally, Applicant refers to this method as AOU (Allocation On Use). AOU, for instance, is described in the specification and drawings of Japanese Patent Application No. 2006-240031.

A user of the storage apparatus is able to effectively use the limited storage resource by freely allocating a real storage capacity to a virtual volume, or cancelling such allocation.

Further, since the virtual LU 38 and the virtual LDEV 40 behave as logical volumes that have apparent capacity, the host 10 correctly recognizes the virtual LU 38 as a general LU 34 with sufficient real capacity, and the replication program in the storage apparatus; that is, the program for realizing the copy between volumes in the storage apparatus also correctly recognizes the virtual volume as a volume with sufficient real storage capacity.

The channel controller 16 of the storage apparatus 14 allocates optimal storage capacity to the virtual LU 38 or the virtual LDEV 40 on a case-by-case basis, and releases the extra storage area from the virtual volume at the stage it is no longer required. A volume (LDEV) 41 has a real storage area to be allocated to the virtual LDEV 40. This volume is managed conceptually as a pool 42.

Access from the host 10 to the LU 34 or the virtual LU 38 is based on non-encrypted data, and the encryption program 26A of the encryption engine 26 of the storage apparatus encrypts this data and stores it in the storage area.

In both the method shown with reference numeral 1 and the method shown with reference numeral 2, storage of write data in the storage area of the hard disk drive unit and reading of read data from the storage area are conducted via the cache memory 24.

Thus, the encryption control program 26A of the storage apparatus 14 performs decryption at the timing the encrypted text is staged to the cache memory 24, and performs encryption at the timing the plain text is destaged from the cache memory.

Meanwhile, in cases where data is to encrypted or decrypted at portions other than the cache; for instance, when encrypting data before such data is written from the host to the cache, or when encrypting data after such data has been written in the disk, there is risk that the performance on the host side will deteriorate for the overhead accompanying the encryption process. Further, in the latter case, each disk must be equipped with an encryption engine.

Figure 27:
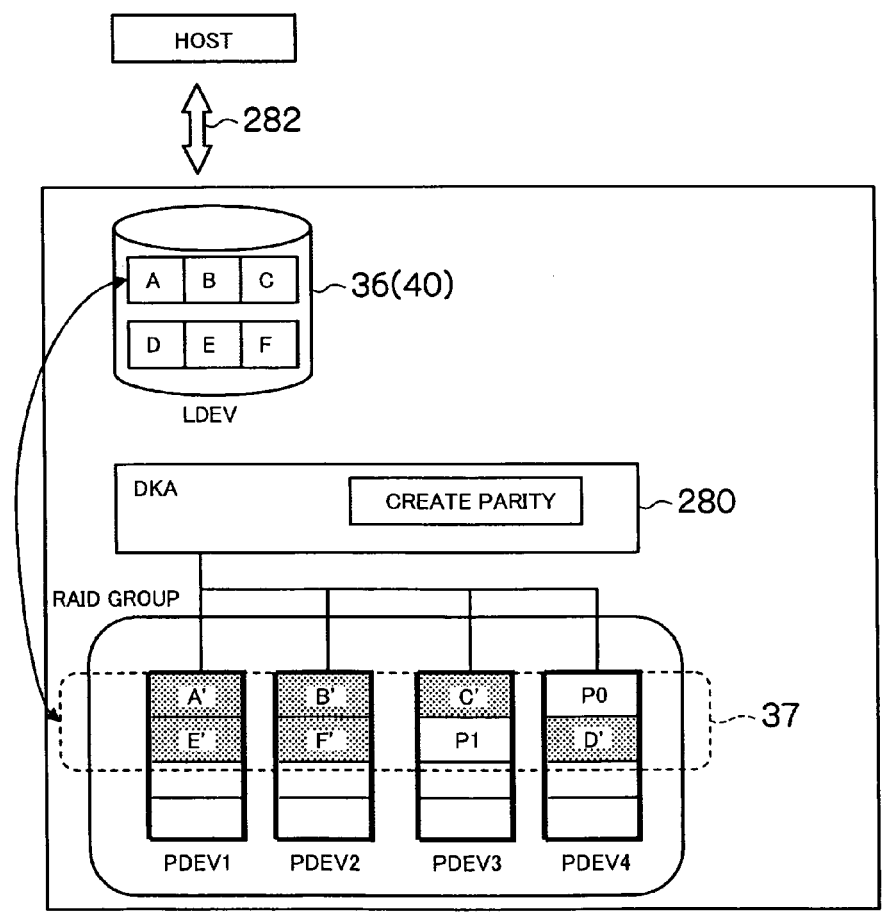
FIG. 27 is a block diagram showing a case when a write I/O is given from the host to a RAID group configured from RAID 5.

FIG. 27 is a block diagram showing a case where a write I/O was given from the host to the RAID group 37 configured based on RAID 5. RAID 5 is configured from 3 data and 1 parity, and data and parity are distributed to the respective hard disk drives.

When the host 10 sends plain text 282 to the LDEV 36 (or the virtual LDEV 40), a DKA 280 encrypts the plain text data (A to F) into encrypted text A' to F', and sequentially writes the encrypted text in a plurality of PDEVs (real volumes configured from real storage areas of the hard disk drive unit 22) in block units. The DKA creates parity data from the encrypted data of a plurality of blocks, and writes this in an arbitrary PDEV. P0 is party of data A', B', and C', and P1 is parity of data E', F', and D'. Incidentally, the DKA is a controller in the storage apparatus that connects the host I/O to the PDEV. Since the storage apparatus creates parity based on encrypted data, it is possible to read encrypted data even when one PDEV malfunctions.

Figure 28:
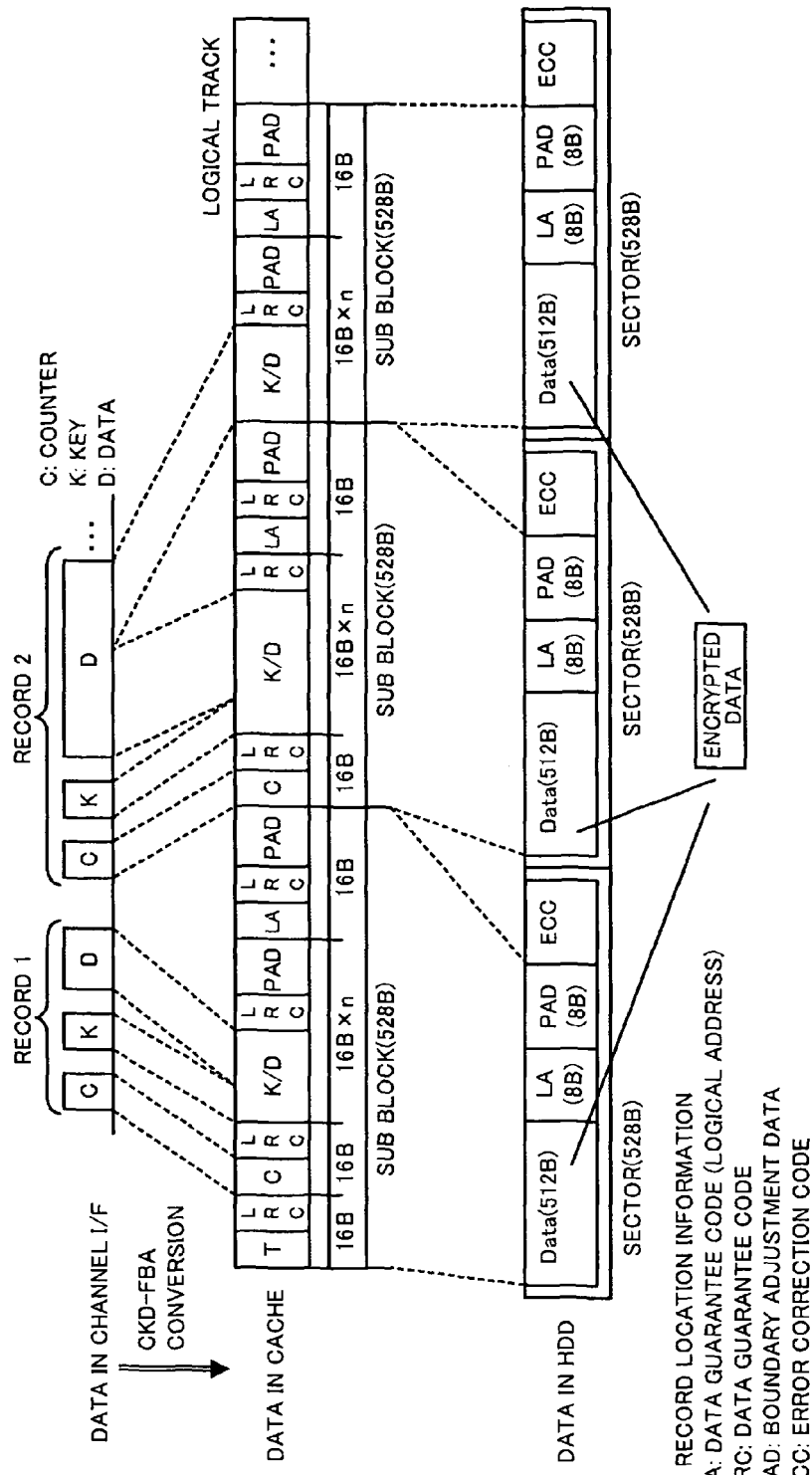
FIG. 28 is a diagram explaining a frame to be issued from a mainframe host to a storage apparatus.

FIG. 28 is a diagram explaining a frame to be issued from a mainframe host to a storage apparatus. A frame is of a CKD (Count Key Data) format, and a CKD formatted frame exists on a channel I/F 32 of the storage apparatus. The channel controller converts this CKD format into an FBA (Fixed Block Architecture), and writes it in the cache memory. Further, the channel controller and the disk controller encrypt the data in the cache memory, further create an error correction code (ECC) from such data, and write these in a plurality of storage devices (HDD) based on the RAID level.

In the foregoing sequence, the subject of encryption is the data portion, and control information such as record position information (T), data guarantee code (LA, LRC), and partition adjustment data (PAD) is not encrypted.

Further, if the storage apparatus encrypts data before it enters the channel I/F, it will not be possible to convert the CKD format into an FBA format and store it in the cache memory. Thus, with a mainframe host, data must be encrypted on the storage apparatus side.

FIG. 4A to FIG. 4E show a plurality of control tables for the storage apparatus to manage a LDEV, and for encrypting data stored in the LDEV These control tables are set by the control terminal 30 to the shared memory of the storage apparatus. The control tables illustrated in FIG. 4 correspond to the method explained as reference numeral 2 in FIG. 3; namely, the method of allocating a real LDEV with a physical storage area to a virtual LDEV Incidentally, this real LDEV is referred to as a pool LDEV.

FIG. 4A shows an example of an encrypted group management table. A LDEV number, a currently effective encryption key (current key), and a one generation old encryption key (backup key) are defined for each encrypted group. An encrypted group is an aggregate of LDEVs encrypted with the same key. The current key becomes the new encryption in the re-key process, and the backup key corresponds to the old encryption in the re-key process. In FIG. 4A, the mark of # represents a virtual LDEV. The new encryption key and the old encryption key can be set for each encrypted group number.

FIG. 4B shows an example of a virtual LDEV management table, and an encrypted bit, a pool number, and a pool LDEV number list are defined for each virtual LDEV number. The virtual LDEV identified as "1" is allocated with pool LDEVs 1, 2 of pool number 1. Since the virtual bit is "1," the pool LDEVs 1, 2 are encrypted with a current key (Key 2) as shown in FIG. 4A.

FIG. 4C shows an example of a mapping management table. Regarding the virtual LDEV number 1, a real address 0 of the pool LDEV 1 to the virtual address "1" of the virtual LDEV. A real address is a logical address corresponding to a plurality of tracks of a real storage area of the hard disk drive unit.

FIG. 4D shows an example of a LDEV management table. "0" of the encrypted bit shows that the corresponding LDEV is not encrypted. Contrarily, "1" of the encrypted bit shows that the corresponding LDEV is encrypted. "1" of the pool use bit shows that the corresponding LDEV is a virtual LDEV using a pool, and "0" of the pool use bit shows that the corresponding LDEV is a LDEV that does not belong to a pool. For instance, the LDEV 36 pertaining to method 1 shown in FIG. 3 is a LDEV in which the pool use bit is "0."

FIG. 4E shows an example of a pool management table. A pool management table is used for managing how the address of the pool LDEV 1 is being allocated to the virtual LDEV. In FIG. 4E, the logical addresses pertaining to address numbers 0 and 1 set with a bit are allocated to the virtual LDEV. The allocated bit being "1," represents allocation, and the allocated bit being "0" contrarily represents no allocation.

Figure 29:
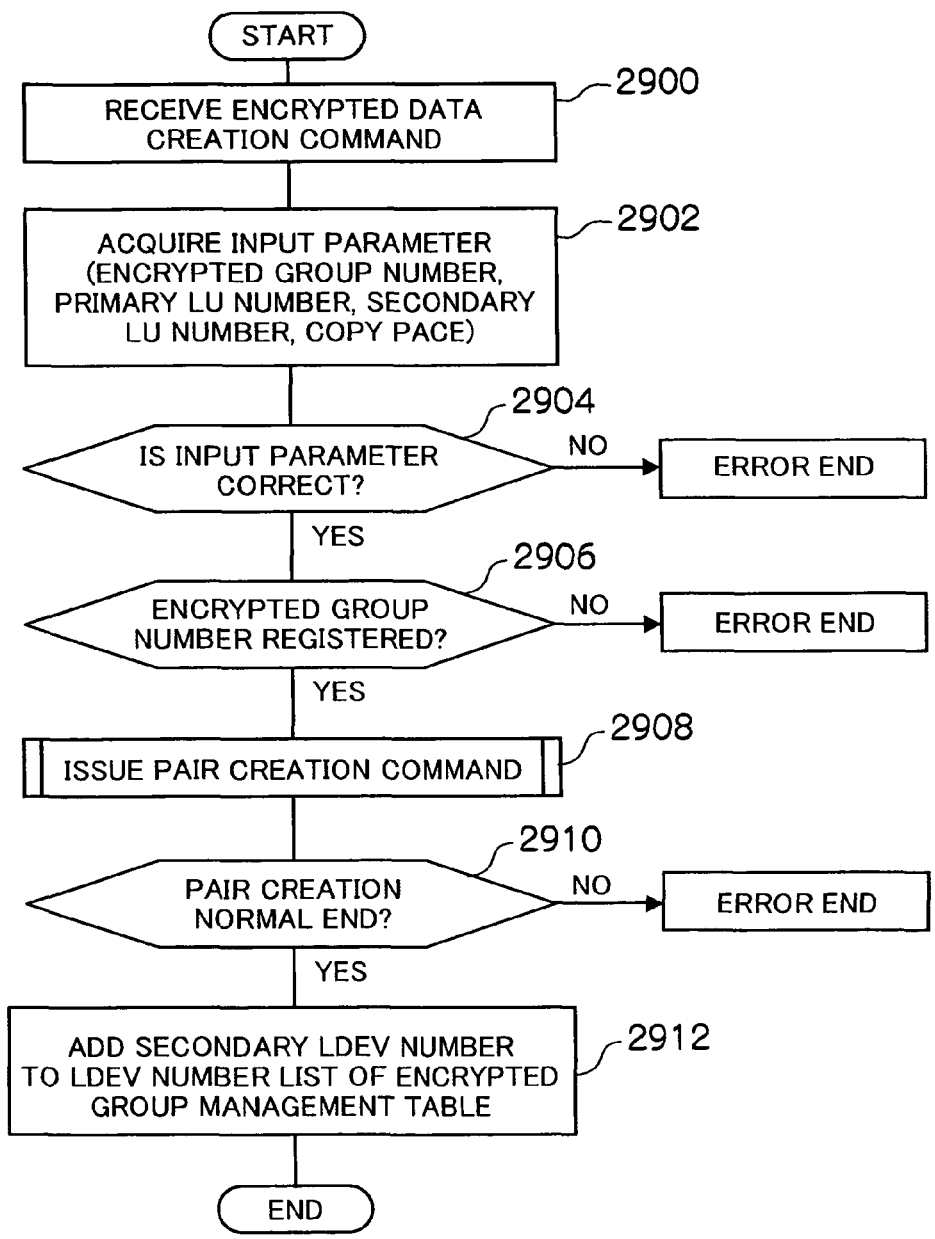
FIG. 29 is a flowchart for creating an encrypted group management table (FIG. 4A)

FIG. 29 is a flowchart for creating an encrypted group management table (FIG. 4A). As a precondition, an encrypted group number must be registered in the encrypted group management table, a LDEV number storing data to be encrypted must be designated as the primary volume number, and the capacity of the primary volume and the secondary volume must be the same. Incidentally, when the volume is a virtual volume, the apparent capacity must be the same.

In FIG. 29, when the storage apparatus receives an encrypted [data] creation command from the host (2900), the controller (DKC) of the storage apparatus acquires the input parameter (encrypted group number, primary LU number, secondary LU number, copy pace) (2902). Subsequently, the DKC determines whether the input parameter is correct. When the DKC obtains a positive determination, the DKC checks whether the encrypted group is registered in the encryption management table (2906). The host or the control terminal thereafter issues a command to the DKC for creating a pair volume (2908).

The DKC checks whether the pair creation ended normally (2910). When the DKC obtains a positive determination, it adds a secondary LDEV number to the LDEV number list of the encrypted group management table (2912), and then ends this processing. FIG. 5 is a functional block diagram explaining the mapping of a pool LDEV to the virtual LDEV 40, and, as illustrated in the mapping management table of FIG. 4 C, shows that a real address 0 of the pool LDEV number 1 is mapped to a virtual address 1 of the virtual LDEV number 1, and a real address 1 is mapped to the virtual address 4.

In other words, the plain text issued from the host 10 to the virtual addresses 1 and 4 of the virtual LDEV is encrypted, and stored in the real addresses 0 and 1 of the pool LDEV 1. Incidentally, since a virtual LDEV is not equipped with a real storage area, its address is referred to as a virtual address, and a pool LDEV is referred to as a real address since it comprises a real storage area.

Figure 6:
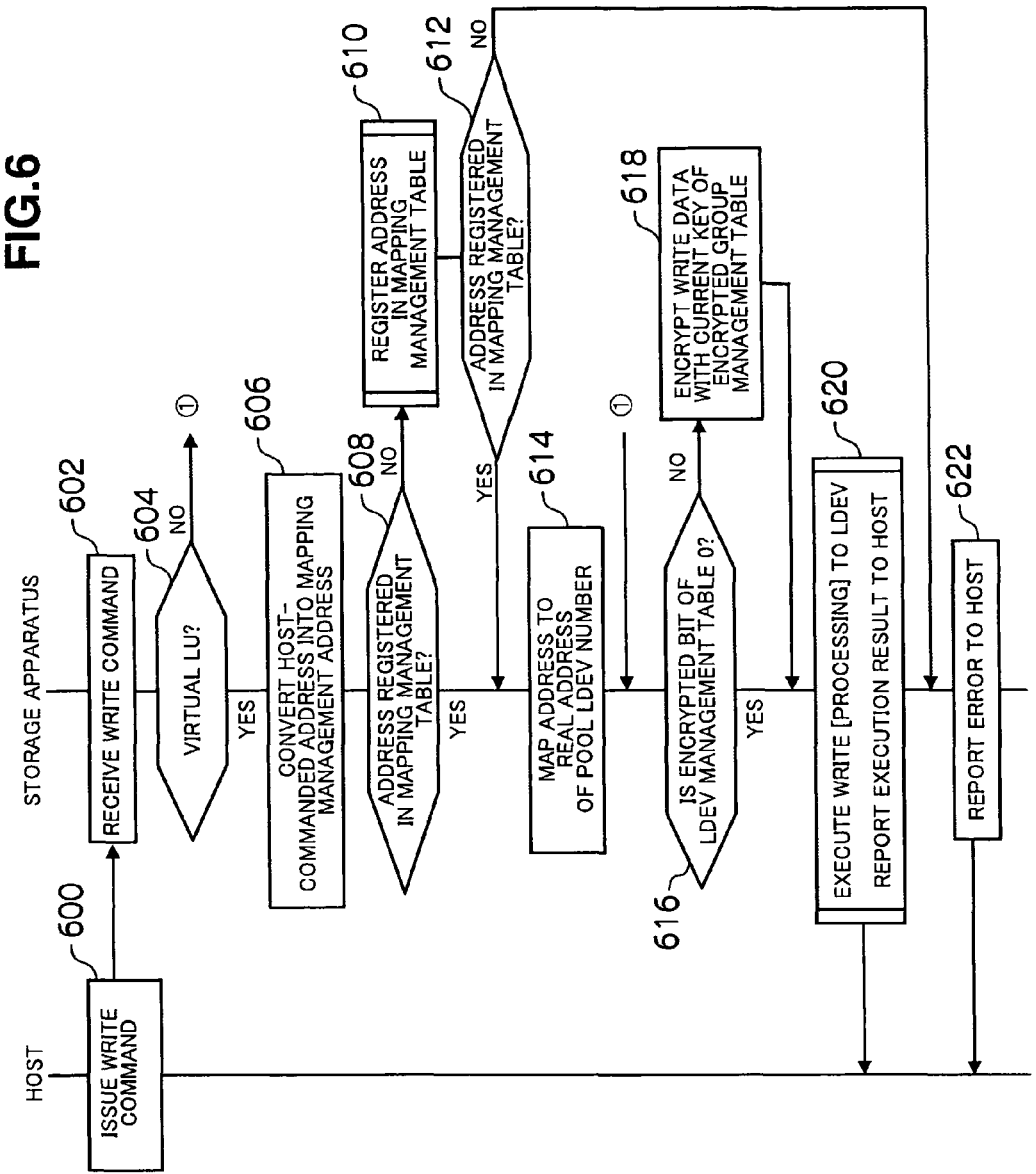
FIG. 6 is a flowchart to be executed by the storage apparatus in order to process a write access from the host.

FIG. 6 is a flowchart to be executed by the storage apparatus (storage subsystem) to the write I/O issued from the host 14. When the host 10 issues a write command to the storage apparatus 14 (600), the channel controller 16 receives and analyzes the write command (602).

The channel controller 16 determines whether the access-target LU of the write command is a virtual LU (604). The shared memory 18 of the storage apparatus, as shown in FIG. 4, stores a management table with attributes on all LUs regarding whether the LDEV of the storage area is a corresponding real LU, or a virtual LU allocated with a virtual LDEV.

When the channel controller determines this to be a virtual LU, it converts the address indicated in the write command from the host into a virtual address of the virtual LDEV (606). Subsequently, the channel controller determines whether the converted address is registered in the mapping management table of FIG. 4C (608). When the channel controller obtains a positive determination, it maps the converted address to a real address of the pool LDEV based on the mapping management table of FIG. 4C (614).

When the channel controller checks the encrypted bit regarding the LDEV based on the LDEV management table shown in FIG. 4D and the encrypted bit is "1," it determines that the data to be stored in the LDEV should be encrypted, and the encryption program 26A refers to the management table of FIG. 4A, reads the current encryption key from the encryption key storage area of the shared memory, and uses such encryption key to encrypt the write data (618).

After the encryption is complete, or when the encrypted bit is "0," the disk controller 20 executes write [processing] to the LDEV corresponding to the LU, and the channel controller 16 reports the execution result to the host (620).

At step 608, when the channel controller determines that the virtual address converted at step 606 is not registered in the mapping management table, it performs processing for registering the virtual address and the real address to be mapped to such virtual address in the mapping management table (610).

Subsequently, the channel controller determines whether the virtual address and the real address have been registered in the mapping management table (612). When the virtual address and the real address have not been registered in the mapping management table, the channel controller reports an error to the host since a real storage area could not be mapped to the virtual address, and it is not possible to execute the write command (622).

Meanwhile, when the channel controller determines that the target LU to which the write command was issued is not a virtual LU; that is, when the channel controller determines that the target LU is a real LU allocated with a LDEV having a storage area, it skips step 604 to step 616, and executes write processing to the LDEV (620).

Figure 25:
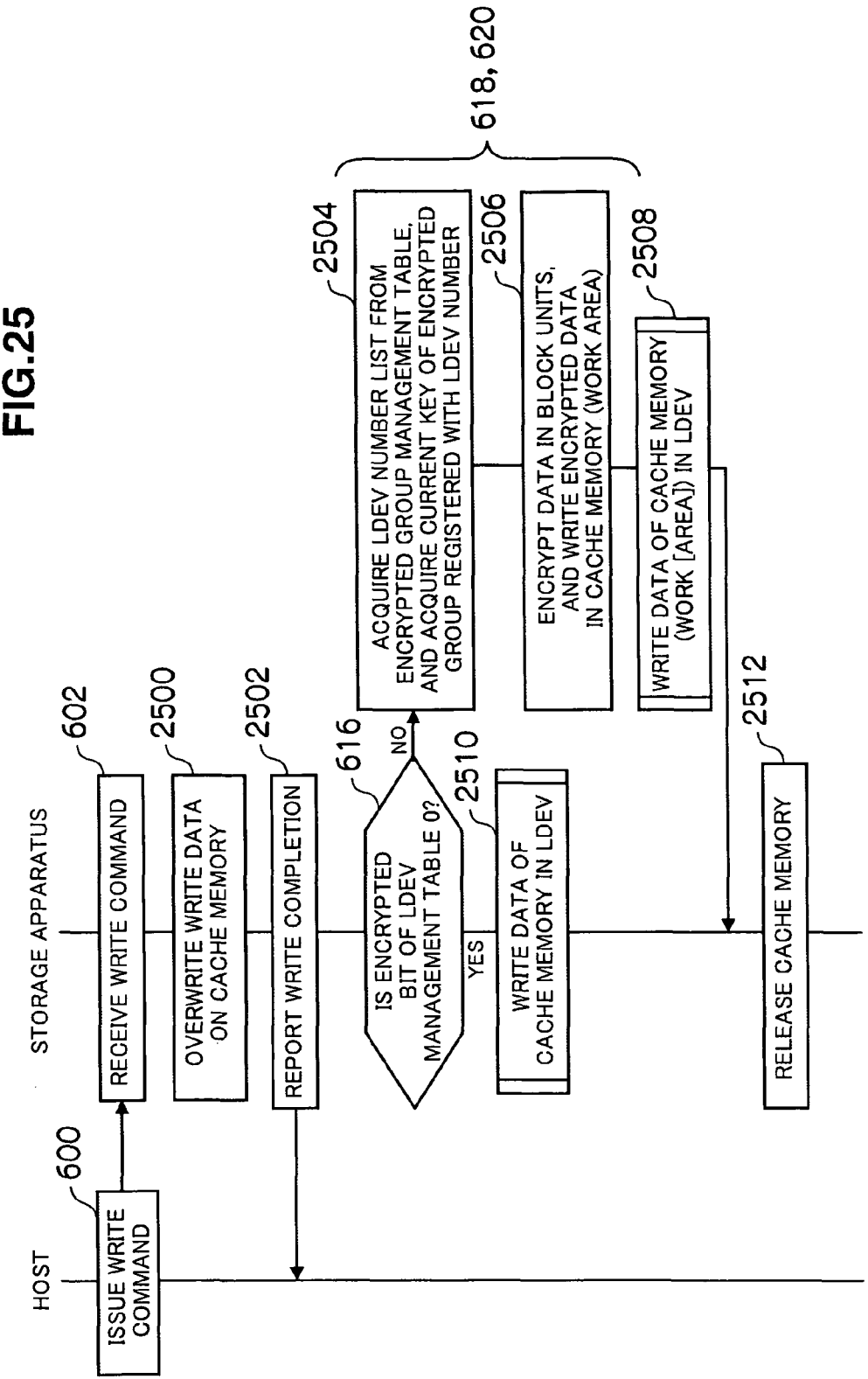
FIG. 25 is a flowchart explaining step 618 and step 620 of FIG. 6 in detail.

FIG. 25 is a flowchart explaining step 618 and step 620 of FIG. 6 in detail. Although not shown in FIG. 6, when the storage apparatus receives a write command, it overwrites plain text in the cache memory (2500), and subsequently reports the completion of writing to the host (2502). As described above, encryption of the storage apparatus is to be performed to the plain text written in the cache memory, and this operation is shown in step 2504 to step 2512.

The channel controller of the storage apparatus acquires a LDEV number list from the encrypted group management table, and acquires the current key of the encrypted group to which the LDEV number is registered (2504). Subsequently, the encryption engine encrypts the plain text based on this current key in block units, and writes the encrypted text in the work area of the cache memory (2506).

The disk control program thereafter writes the data in the work area of the cache memory in the LDEV (2508), and further releases the work area of the cache memory (2512).

Figure 7:
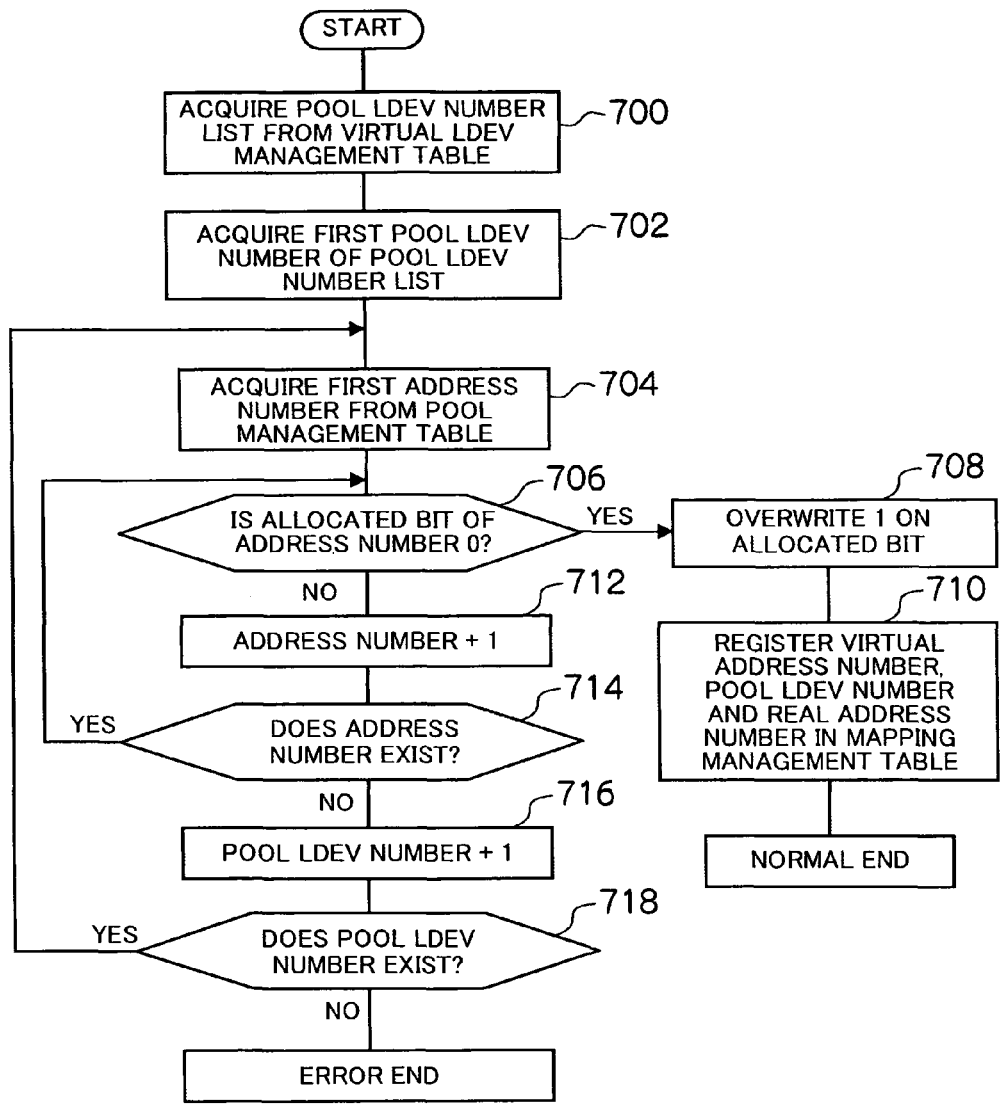
FIG. 7 is a flowchart showing the allocation of a real address (real storage area) to the pool LDEV.

FIG. 7 is a flowchart explaining step 610 of FIG. 6 in detail. The channel controller acquires a list of pool LDEV numbers corresponding to the virtual LDEV based on the virtual LDEV management table of FIG. 4B (700). The channel controller acquires the initial pool LDEV number of the pool LDEV number list (702). Subsequently, the channel controller refers to the pool management table of FIG. 4E regarding the initial pool LDEV, and acquires the initial address number (704). The initial address number is "0" in the case of the pool management table of FIG. 4E. The channel controller thereafter checks the allocated bit regarding the acquired address number (706).

When the allocated bit is "0," the channel controller determines that the address corresponding to this allocated bit is an address that is not allocated to the virtual LDEV, and overwrites "1" over this allocated bit (708). Subsequently, the channel controller registers this address as the real address, and the virtual address number and the pool LDEV number in the mapping management table of FIG. 4C (710), and normally ends the processing sequence.

Meanwhile, in the determination at step 706, when the allocated bit is "1," that is, when the address number of the LDEV has already been allocated to the virtual address of the virtual LDEV, the channel controller increments the address number in order to search for another address (712), and re-executes the processing at step 706. When an empty address is not discovered even after checking all address numbers (714), the channel controller increments the pool LDEV number (716), and executes the detection of an empty address regarding the pool LDEV of the subsequent number to be specified in the pool LDEV number list.

When the channel controller is not able to discover an empty address regarding all pool LDEVs even after performing the processing up to step 716 (718), it notifies the host of an error and then ends this processing. Here, a user may operate the management terminal may create a new LDEV and allocate it to the virtual LDEV.

Figure 8:
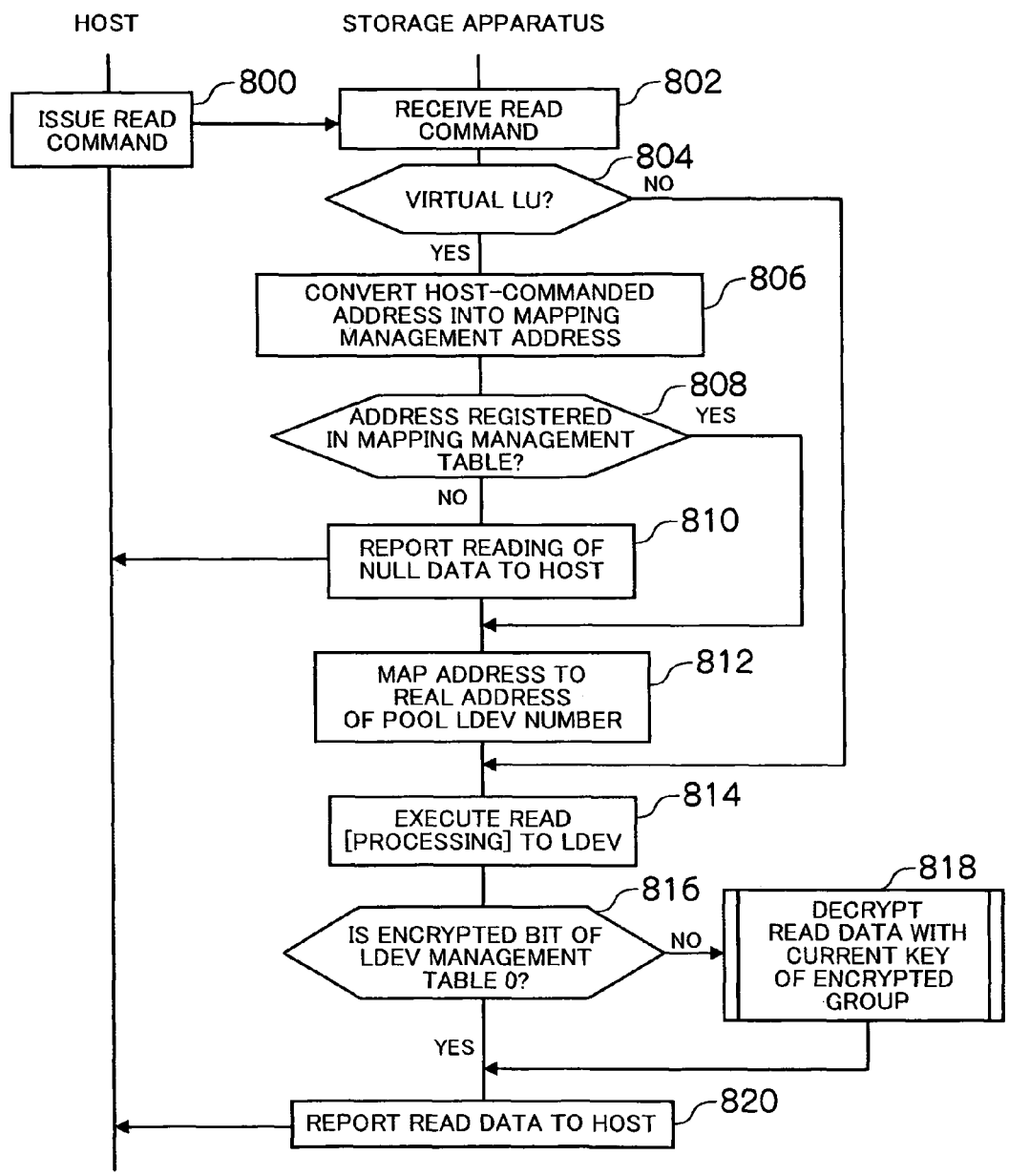
FIG. 8 is a flowchart to be executed by the storage apparatus in order to process a read access from the host.

FIG. 8 is a flowchart showing the processing sequence of the storage apparatus decrypting the encrypted text stored in the storage area using an encryption key based on a read command from the host to make it a plain text, and returning such plain text to the host. The host issues a read command to the storage apparatus (800). When the channel controller receives the read command (802), it determines whether the target LU of the read command is a virtual LU (804).

When the target LU is a real LU, the channel controller executes a read command to the LDEV corresponding to this LU (814). In other words, the channel controller checks the encrypted bit of the LDEV management table (816), determines that the LDEV is a non-encrypted volume when the encrypted bit is "0," reads data from the disk controller, and reports the read data to the host (820).

Meanwhile, when it is determined that the encrypted bit is "1" at step 816, the encryption engine decrypts the target data of the read command using the current encryption key of the encrypted group management table (818).

Meanwhile, when it is determined at step 804 that the target LU of the read command is a virtual LU, the storage apparatus needs to recognize the read address mapped to the virtual LU, and read the target data of the read command from the real address. Thus, the channel controller converts the address indicated by the host into a virtual address of the virtual LU (806).

Subsequently, the channel controller checks whether the converted address has been registered in the mapping management table (808). When the channel controller obtains a positive determination, it recognizes the pool LDEV number from the converted address based on the mapping management table, and thereafter acquires the corresponding real address (812). The disk controller that became aware of this real address executes a read command to the real address (814).

Meanwhile, when it is determined at step 808 that the virtual address is not registered in the mapping management table, the channel controller deems that there is no data to be read, and replies NULL data to the host (810).

Figure 26:
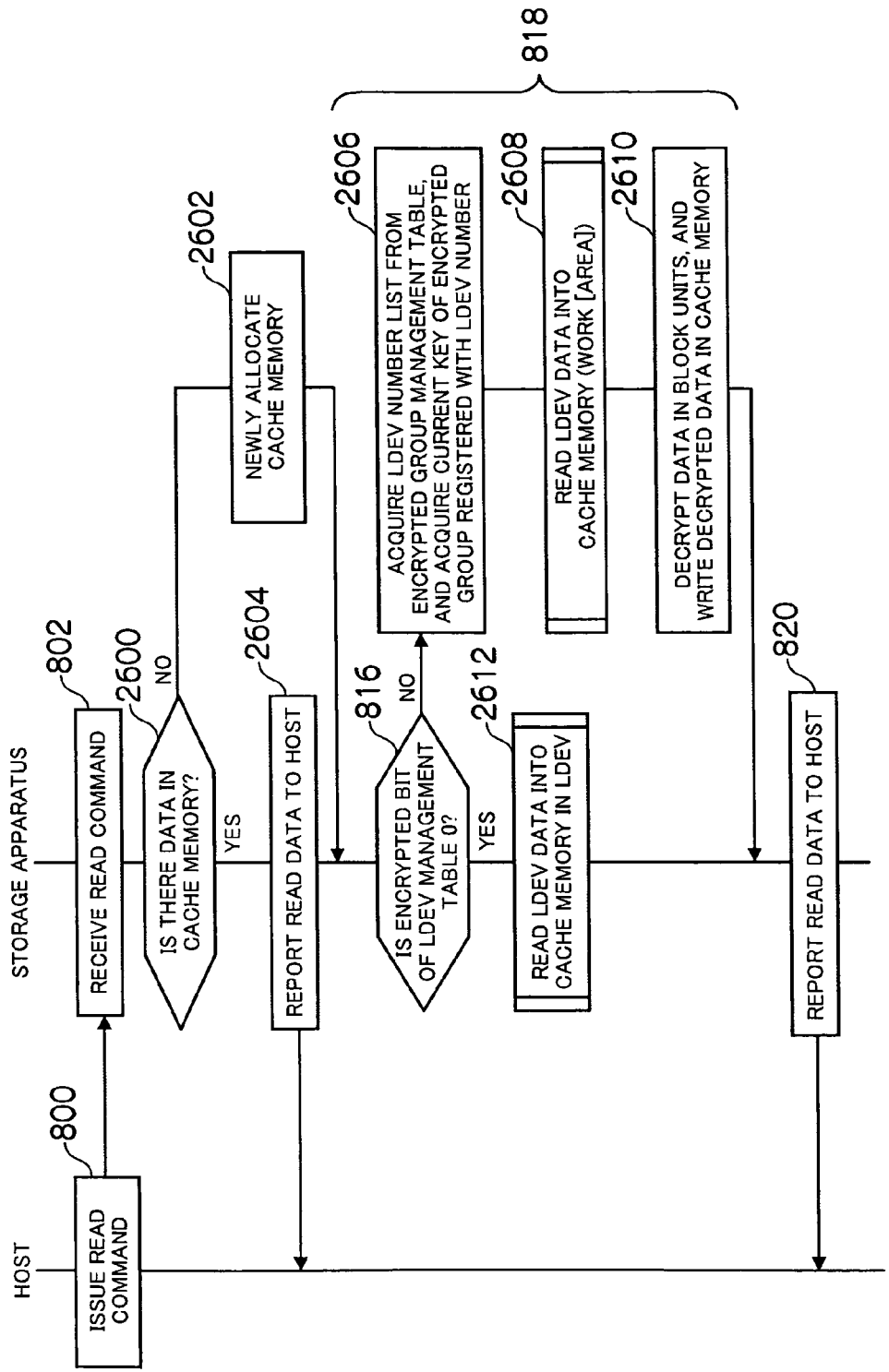
FIG. 26 is a flowchart explaining step 818 of FIG. 8 in detail.

FIG. 26 is a flowchart explaining step 818 of FIG. 8 in detail. Although not explained in FIG. 8, when the channel controller receives a read command (802), it checks whether there is read data in the cache memory (2600), and reports the read data to the host upon obtaining a positive determination (2604). Meanwhile, when the channel controller obtains a negative determination, it sets a work area to which the read data is to be stored (2602).

Subsequently, the channel controller checks the encrypted bit in the LDEV management table, and, when the encrypted bit "1," it acquires the LDEV number list from the encrypted group management table, and acquires the current key of the encrypted group to which the LDEV number is registered (2606). The disk controller thereafter reads the encrypted text stored in the LDEV into the work area of the cache memory (2608). Subsequently, the encryption engine decrypts the encrypted text in block units, and writes the decrypted plain text in the cache memory (2610). The channel controller thereafter reports the read data to the host (820).

Details concerning the encryption function of the storage apparatus are now explained with reference to FIG. 9. The host 10 issues a write request of plain text to the virtual LU 1

(38). The encryption engine of the storage apparatus encrypts the plain text data issued to the virtual LU 1 (38) using an encryption key A, and issues the encrypted text to the virtual LDEV 1 (40). Since the virtual LDEV 1 is allocated with the LDEV of the pool 42, the encrypted text will actually be stored in the pool LDEV.

In this situation, the volume pair control program 16B of the channel controller 16 creates a secondary volume (virtual LDEV 2 (40A)) to form a pair with the virtual LDEV 1 (40) during the re-key processing when the encryption key is to be exchanged. Further, the encryption engine decrypts the encrypted text of the virtual LDEV 1 (40) as the primary volume using the encryption key A, and the disk controller encrypts the decrypted data using a new encryption key B and stores such data in the storage area of the virtual LDEV 2 (40A). When the re-key processing concerning all encrypted text of the primary volume 40 is complete, the disk controller thereafter restores the encrypted text of the secondary volume 40A to the primary volume 40.

Like this, as a result of using a primary/secondary volume pair during the re-key processing performed to the logical volume, the logical volume will not be encrypted with two types of encryption keys, and access from the host to the primary volume during the re-key processing period can be continued. Thus, there is no risk of obstructing the host's business during this period.

Figure 30:
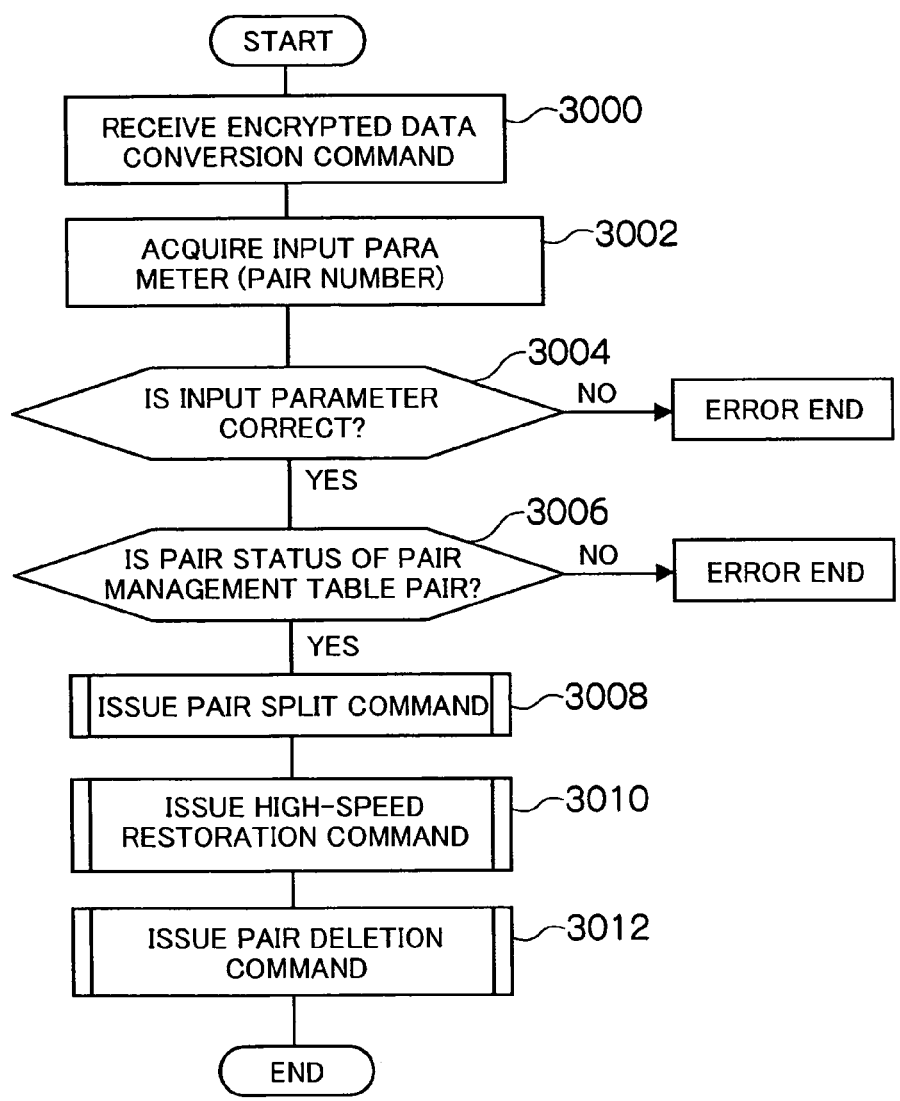
FIG. 30 is a flowchart explaining the outline of the encrypted data conversion operation during the re-key processing.

FIG. 11 shows an example of the re-key process. In FIG. 11, the primary volume (VOL) corresponds to the virtual LDEV 1 in FIG. 9, and old data encrypted with the old encryption key is stored in the storage area allocated to this virtual LDEV 1. FIG. 30 is a flowchart explaining the outline of the encrypted data conversion operation to be performed during the re-key processing. When the DKC of the storage apparatus receives from the host or the like an encrypted data conversion command which implies the start of re-key processing (3000), it acquires a volume pair number as one of the input parameters (3002). The DKC thereafter checks whether the input parameter is correct (3004), and, upon obtaining a positive determination, it checks whether the pair status of the pair management table is "PAIR" (3006).

When the pair status of the pair management table is "PAIR," the DKC performs encryption conversion processing deeming that a volume pair for converting encrypted text based on an old encryption key into encrypted text based on a new encryption key exists. After the encryption conversion processing is complete, the host issues a pair split command (3008), issues a high-speed restoration command (3010), and thereafter issues a pair deletion command (3012). The contents thereof are now explained in detail with reference to FIG. 11.

In the first stage of re-key processing, a user issues a re-key processing command; that is, a data conversion preparation command to the volume pair control program. Thereby, the pair status between the primary volume and the secondary volume is changed from "SIMPLEX" to "COPY."

"SIMPLEX" corresponds to a state where no pair is defined, and "COPY" corresponds to a state where the encrypted text of the primary volume is decrypted with an old encryption key and converted into plain text, and this plain text is re-encrypted with a new encryption key and stored in the secondary volume. Thus, the volume pair control program creates a secondary volume in relation to a primary volume.

Figure 9:
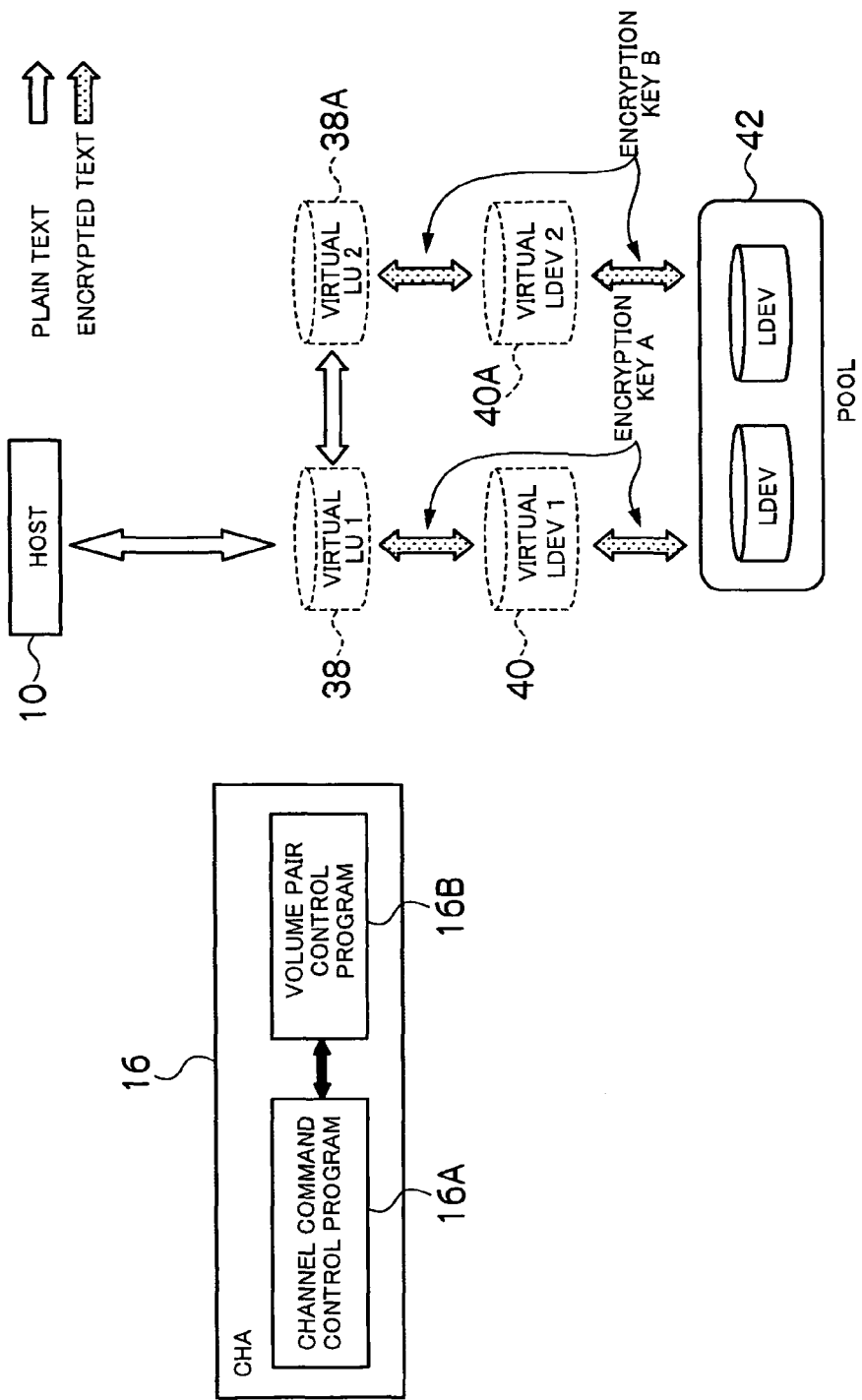
FIG. 9 is a block diagram for encrypting a pair configured from virtual volumes in order to perform re-key processing.

This secondary volume corresponds to the virtual LDEV 2 of FIG. 9. A pair status is a control code to be in the pair management table described later. The volume pair control program controls various processes between the volume pair based on the pair status.

Subsequently, at the second stage, the pair status between the two volumes is changed from "COPY" to "PAIR," which shows that the copy is complete. During this time, the disk controller reads the encrypted data in block units determined based on the storage area of the virtual LDEV 1, decrypts the data read by the encryption engine using an old encryption key (encryption key A), re-crypts such data using a new encryption key (encryption key B), and the disk control program stores the encrypted data in the virtual LDEV 2. When the user issues a progress confirmation command to the volume pair control program, the volume pair control program reports the completion of data conversion preparation to the user.

Subsequently, when the decryption and re-encryption of all encrypted text of the primary volume are complete, the volume pair control program pair-splits the virtual volume LDEV 2 as the secondary volume from the virtual LDEV 1 as the primary volume at the third stage in order to fix the data image of the secondary volume. "PSUS" shows a state where copy is suspended based on the user's operation.

At the fourth stage of re-key processing, the volume pair control program restores the encrypted text of the secondary volume to the primary volume. During this period, the pair status is changed from "PSUS"→"REST"→"PSUS." "REST" shows that restoration is being executed between the primary volume and the secondary volume.

At the fifth stage, the secondary volume is deleted from the pair with the primary volume ("PSUS"→"SIMPLEX"), and the pool LDEV allocated to the secondary volume is released. From pair split to pair deletion, the I/O from the host to the primary volume is suspended. Nevertheless, since the process from pair split to restoration is performed at high speed, access from the host to the primary volume will be treated as an error, and will be subject to retry processing.

Data from the host during the re-key processing period is recorded in both the primary volume and the secondary volume. Write access to the primary volume is converted into encrypted text with an old encryption key or a new encryption key, and write access to the secondary volume is converted into encrypted text with a new encryption key.

FIG. 10A shows an example of a pair management table, and this is stored in the shared memory of the storage apparatus. The pair management table shown in FIG. 10A has registered therein, for each pair number, a LDEV number of a primary volume, a LDEV number of a secondary volume to form a pair with the primary volume, and the pair status of the primary volume and secondary volume. In pair number 1, the virtual LDEV #1 is the primary volume, and the virtual LDEV #3 is the secondary volume, and the pair status between both volumes is registered as "COPY."

Incidentally, the pair status of "PSUE" is a state where the copy is suspended due to the occurrence of a failure. In the pair management table A, pair number 2 shows that both the primary LDEV number and the secondary LDEV number are undefined, and the pair status is in a state of where the pair is undefined.

FIG. 10B shows an example of a virtual LDEV management table that illustrates, regarding each virtual LDEV specified with a virtual LDEV number, an encrypted bit showing whether the virtual LDEV is an encrypted volume, a pool number to be allocated to the virtual LDEV, a pool LDEV number list, and the correspondence of the virtual LDEV with the volume status. The volume status of "PVOL" shows a primary volume, "SVOL" shows a secondary volume, and SIMPLEX shows that a volume attribute is not defined.

FIG. 10C shows an example of a mapping management table, and the mapping management table has registered therein a pool LDEV number corresponding to a virtual address having the virtual LDEV number 1, a pool LDEV number, and a correspondence of the real address and the copy status of the pool LDEV.

FIG. 12A and FIG. 12B are tables for managing the copy from a primary volume to a secondary volume. FIG. 12A is a table for managing the copy status of a pair number and the primary volume belonging to this pair number. The table of FIG. 12A shows that, regarding the pool LDEV of the pool LDEV number 1 pertaining to the pair number 1 of the pair management table shown in FIG. 10A, copy to the secondary volume of the virtual LDEV number 3 has progressed to the track number of area "21" where the real address is "0," the copy pace as the copy speed is "Medium," the pair match ratio of the primary volume and the secondary volume; that is, 22% of the entire encrypted data volume of the primary volume has been converted with a new encryption key and stored in the secondary volume. As other speeds for copy pace, there are "Fast" and "Slow."

FIG. 12B is a table for managing the differential with the secondary volume regarding the respective tracks of the storage area (pool LDEV) allocated to the primary volume. A differential pointer and an update pointer are set in correspondence to the tracks of the each real address of the primary volume. The differential pointer corresponds to the differential bitmap table. Each bit corresponds to each track number. When the copy of data from the primary volume to the secondary volume is complete, bit "1" showing that there is a difference between the primary volume and secondary volume as the bit corresponding to the track in which copy is complete is rewritten as bit "0" showing that there is no difference between the primary volume and the secondary volume. When copy is to be performed between the primary volume and the secondary volume, "1" is initially set to all bits of the differential bitmap table.

The update pointer corresponds to the update bitmap table. When there is a write access from the host to a specific track of the primary volume, bit "1" showing that the bit corresponding to this track has been updated is set.

FIG. 13 is a diagram explaining copy C1 from the virtual LDEV 1 (40) to the virtual LDEV 2 (40A) based on the pair management table of FIG. 10A; that is, the operation of re-encryption processing of re-encrypting data, which was encrypted with an old encryption key, using a new encryption key.

Based on FIG. 10C, the storage apparatus associates the real address 0 of the pool LDEV 1 to the virtual address "1" of the virtual LDEV 1, and associates the real address 1 of pool LDEV 1 to the virtual address "4" of the virtual LDEV 1.

Further, as shown in FIG. 13, [the storage apparatus] allocates the real address "2" of the pool LDEV 1 to the virtual address "1" of the virtual LDEV 2, and allocates the real address "3" of the pool LDEV 1 to the virtual address "4" of the virtual LDEV 2.

Therefore, the encrypted text that was encrypted with an old encryption key is stored in the real address "0" and the real address "1" of the pool LDEV 1. Further, the encrypted text that was encrypted with a new encryption key is stored in the real address "2" and the real address "3" of the pool LDEV 1.

FIG. 14 is a block diagram explaining the processing for the channel controller to restore the encrypted data to the virtual LDEV 1 with the new encryption key of the virtual LDEV 2. This restoration process can be achieved at high-speed simply by switching the mapping information to the virtual LDEV 1 of the mapping management table and the mapping information to the virtual LDEV 2 of the mapping management table.

Mapping information, as shown in FIG. 10C, is the pool LDEV number to the virtual address of the virtual LDEV, and the real address. As shown in FIG. 14, by mutually switching the mapping information to the respective virtual LDEVs of the pool LDEV 1, the mapping to the real address of the pool LDEV 1 of the virtual LDEV 1 is changed from the real addresses "0" and "1" to the real addresses "2" and "3." Mapping to the real address of the pool LDEV 1 of the virtual LDEV 2 is changed from the real addresses "2" and "3" to the real addresses "1" and "2."

Since data encrypted with the new encryption key is stored in the addresses "2" and "3" of the pool LDEV 1, data encrypted with the new encryption key as a result of the restoration is associated with the virtual LDEV 1. This restoration does not involve the copy between volumes, and can be achieved at high speed merely by exchanging the mapping data in the control memory.

Figure 15:
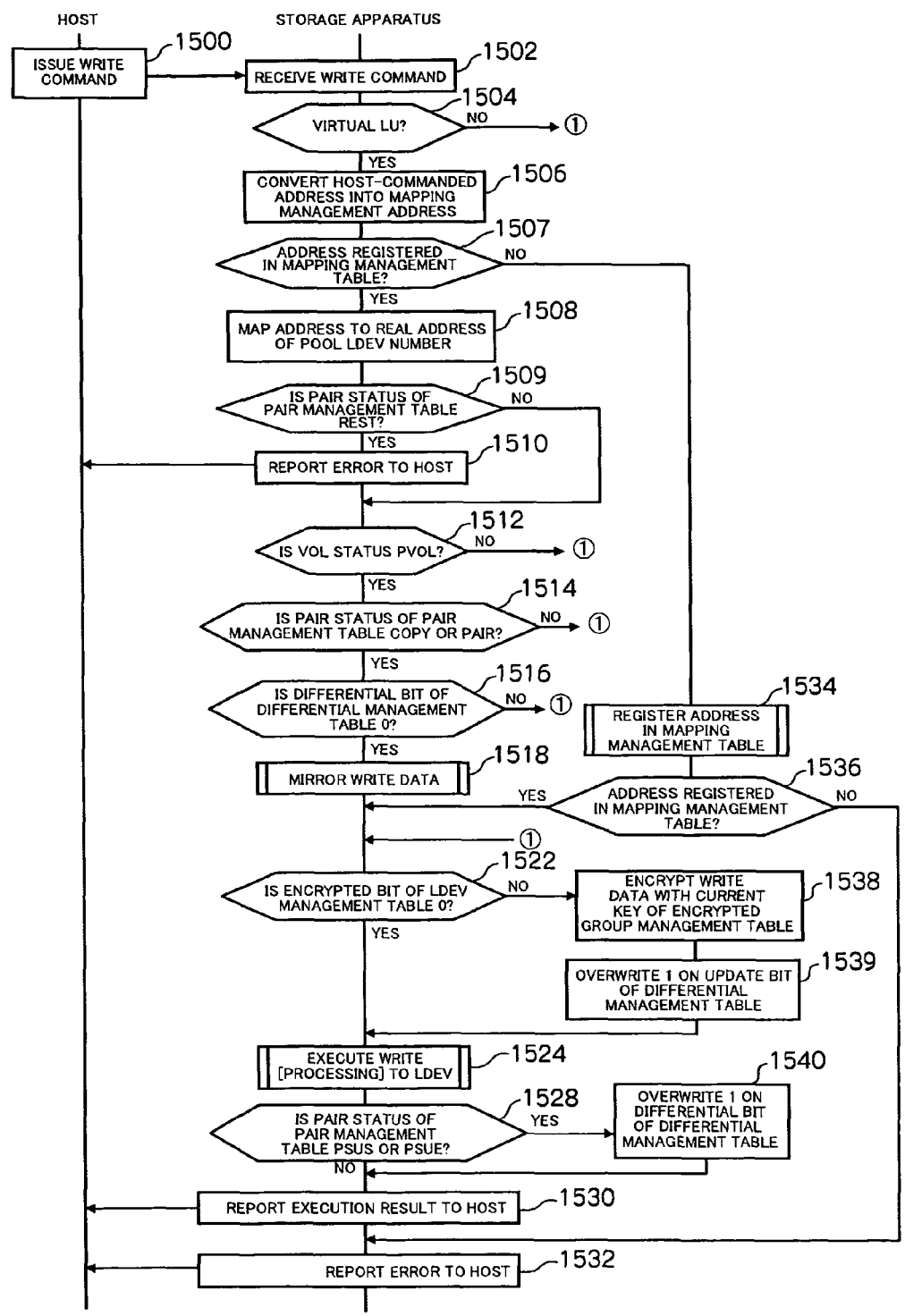
FIG. 15 is a flowchart showing the operation of mirroring the write data from the host to the primary volume and a secondary volume.

FIG. 15 is a flowchart explaining the processing for mirroring data to the primary volume (virtual LDEV 1) and the secondary volume (virtual LDEV 2) when the storage apparatus receives a write access from the host during the re-key processing.

When the host issues a write command to the storage apparatus (1500), the channel controller of the storage apparatus receives a write command (1502). Subsequently, the channel controller determines whether the target LU of the write command is a virtual LU (1504).

When the channel controller determines that the target LU of the write command is a virtual LU, it converts the address instructed from the host into a virtual address of the virtual LDEV (1506). Subsequently, the channel controller determines whether the virtual address has been registered in the mapping management table (1507).

When the channel controller determines whether the virtual address has been registered in the mapping management table, it maps the real address of the volume of the pool LDEV number corresponding to the virtual address according to the mapping management table (1508). The channel controller thereafter checks the pair status of the pair management table (1509), and returns an error to the host when the pair status is "REST" (restoration) (1510). When a write command is executed during restoration, the write command to the primary volume and the switching of mapping data pursuant to the restoration will compete against each other, and there is a possibility that data based on the host I/O will be lost. As described above, since restoration will be completed in a short period of time, the host that received the error report merely needs to retry the process.

The channel controller checks the virtual LDEV management table and determines whether the volume status of the target volume of the write command is "PVOL" (1512). When the channel controller obtains a positive determination, it determines whether pair status of the pair management table is "COPY" or "PAIR" (1514).

When the channel controller obtains a positive determination, this implies that re-key processing is being performed between the primary volume and the secondary volume. Subsequently, the channel controller checks the differential management table and determines whether the differential bit of the target track of the data write request based on the write command is "0" (1516). When the differential bit is "0," the channel controller determines that re-key processing is complete regarding this track, and that mirroring of the write data is required. Thus, the channel controller writes the write data in the cache area of both the primary volume and the secondary volume (1518).

Subsequently, the channel controller refers to the LDEV management table and checks whether the encrypted bit is "0" (1522). When the encrypted bit is "1," the encryption engine encrypts the write data using the current key of the encrypted group management table (1538). Subsequently, in order to clarify that the target track of the write request at step 1538 was encrypted with a new encryption key and not an old encryption key, the channel controller overwrites "1" as the update bit on the corresponding bit of the update bitmap in the differential management table in relation to this track (1539). Meanwhile, when the encrypted bit is "0," the channel controller writes the write in the volume (LDEV) without encryption (1524).

When it is determined at step 1504 that the target LU is not a virtual LU, since the target LU of the write command is not the volume of re-key processing, the channel controller jumps to step 1522 without mirroring the write data. The same applies to cases when the target volume of the write command is determined not to be PVOL at step 1512, and when the pair status of the target volume of the write command is determined not to be COPY or PAIR at step 1514.

The channel controller determines whether the pair status in the pair management table of the target volume of the write command is PSUS or PSUE (1528), and, when the pair status is COPY or PAIR (positive determination at step 1514), it negates the determination at step 1528 and reports the completion of mirroring to the host (1530).

Meanwhile, when the channel controller obtains a negative determination at step 1514, since the write-target LDEV is not of a pair status, a positive determination is given at step 1528, and "1" is overwritten on the differential bit corresponding to the write-target track (1540).

When the channel controller obtains a negative determination at step 1507, since a pair volume does not exist regarding the write-target virtual address, it is not necessary to write the write data in both the primary volume and the secondary volume. Thus, the channel controller proceeds to step 1534, registers the virtual address in the mapping table, and then maps the real address thereto.

When this mapping is complete, the channel controller determines whether it was possible to map the real address to the virtual address (1536). When the channel controller obtains a positive determination, it proceeds to step 1522 in order to write the write data in the real address. Meanwhile, when the channel controller obtains a negative determination, since this means that a storage area cannot be allocated to the write-target volume, the storage apparatus reports an error to the host as described in step 1532.

Figure 16:
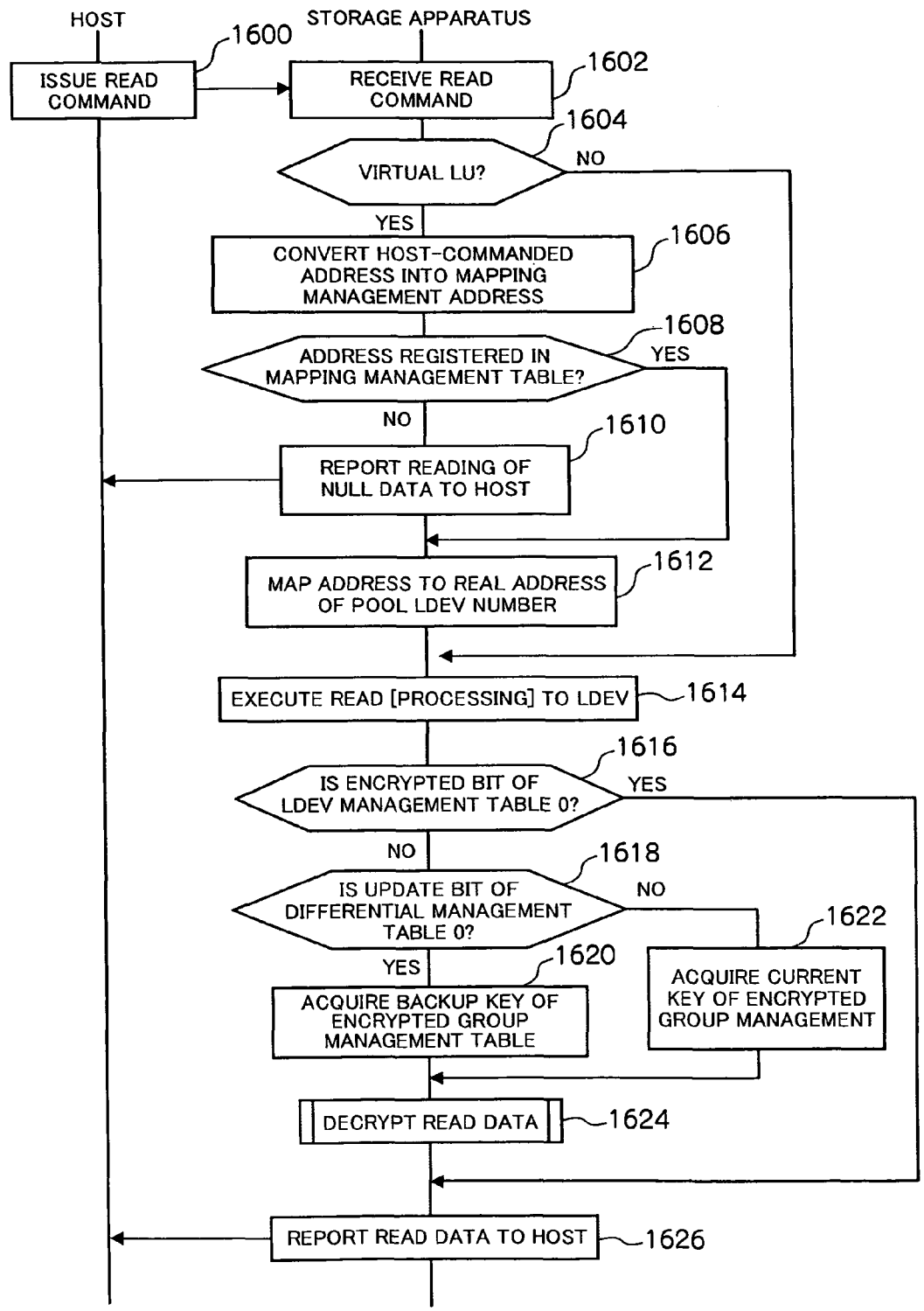
FIG. 16 is a flowchart for processing a read command from the host system to the primary volume.

FIG. 16 is a flowchart showing the operation in a case where a read command is issued from the host to the primary volume subject to a write access from the host during re-key processing. The host issues a read request to the storage apparatus (1600). The channel controller of the storage apparatus receives the read command (1602). Step 1604 to step 1614 are the same as step 804 to step 814 of FIG. 8.

The channel controller, at step 1616, refers to the LDEV management table regarding the target LDEV of the read command and checks whether the encrypted bit is "0." When the encrypted bit is "0," since the data read from the LDEV at step 1614 is plain text data that has not been encrypted, this is reported to the host as is (1626).

Meanwhile, when the encrypted bit is determined to be "1" at step 1616, since the data read from the LDEV is encrypted text, it is necessary to decrypt such data using an encryption key. Thus, the channel controller refers to the corresponding update bit of the differential management table regarding the read-target track, and, when the update bit is "0," since this means that there is no write access from the host during the re-key processing, the channel controller acquires the backup key (old encryption key) of the encrypted group management table (1620) and decrypts the read data (1624).

Meanwhile, when the update bit is "1," since this means that the write data from the host was encrypted with the current key (new encryption key) during the re-key processing, the encryption engine acquires the current key of the encrypted group management table (1622) and decrypts the read data (1624).

Figure 17:
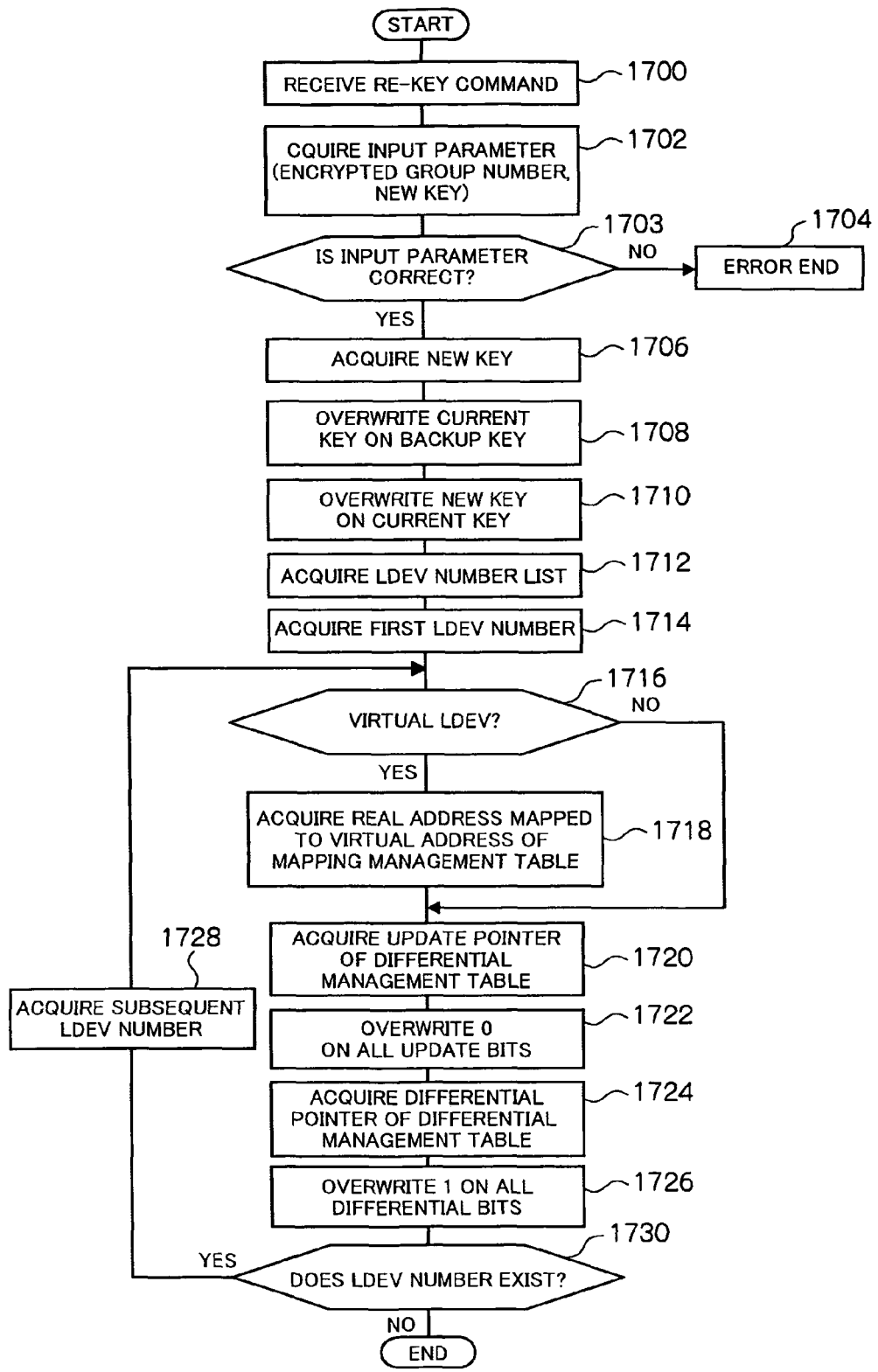
FIG. 17 is a flowchart for performing re-key processing between the primary volume and the secondary volume.

FIG. 17 is a flowchart for exchanging keys in re-key processing. When the channel controller receives a re-key command from the management terminal or the host (1700), it acquires the input parameters (encrypted group number, new key) (1702). When the input parameters are incorrect, the channel controller ends this flowchart in error (1703, 1704).

When the channel controller determines that the input parameters are correct, it acquires a new encryption key (1706), overwrites a new encryption key on the current key of the encrypted group management table, and overwrites the old encryption key on the backup key (1708, 1710).

Subsequently, in order to encrypt the volume, which was encrypted with an old key, using a new key, the channel controller acquires the LDEV number list belonging to the encrypted group requiring the re-key processing from the encrypted group management table (1712).

The channel controller acquires the first LDEV number (1714), and then determines whether the acquired LDEV is a virtual LDEV (1716).

In the case of a virtual LDEV, the channel controller refers to the mapping management table and acquires the real address to be mapped to the virtual LDEV (1718). Subsequently, the channel controller acquires the update pointer of the differential management table (1720), overwrites "0" on all update bits (1722), and prepares to execute re-key processing to the LDEV acquired at step 1714.

Further, the channel controller acquires the differential pointer of the differential management table (1724), and overwrites "1" on all differential bits (1726). The channel controller thereafter checks whether there is any other LDEV number (1730) and, upon obtaining a positive determination, it acquires the subsequent LDEV number and returns to step 1716. Meanwhile, when there is no other LDEV number, the channel controller ends this processing. Meanwhile, when the LDEV of the acquired LDEV number is not a virtual LDEV, the channel controller skips step 1718 and proceeds to step 1720.

Figure 18:
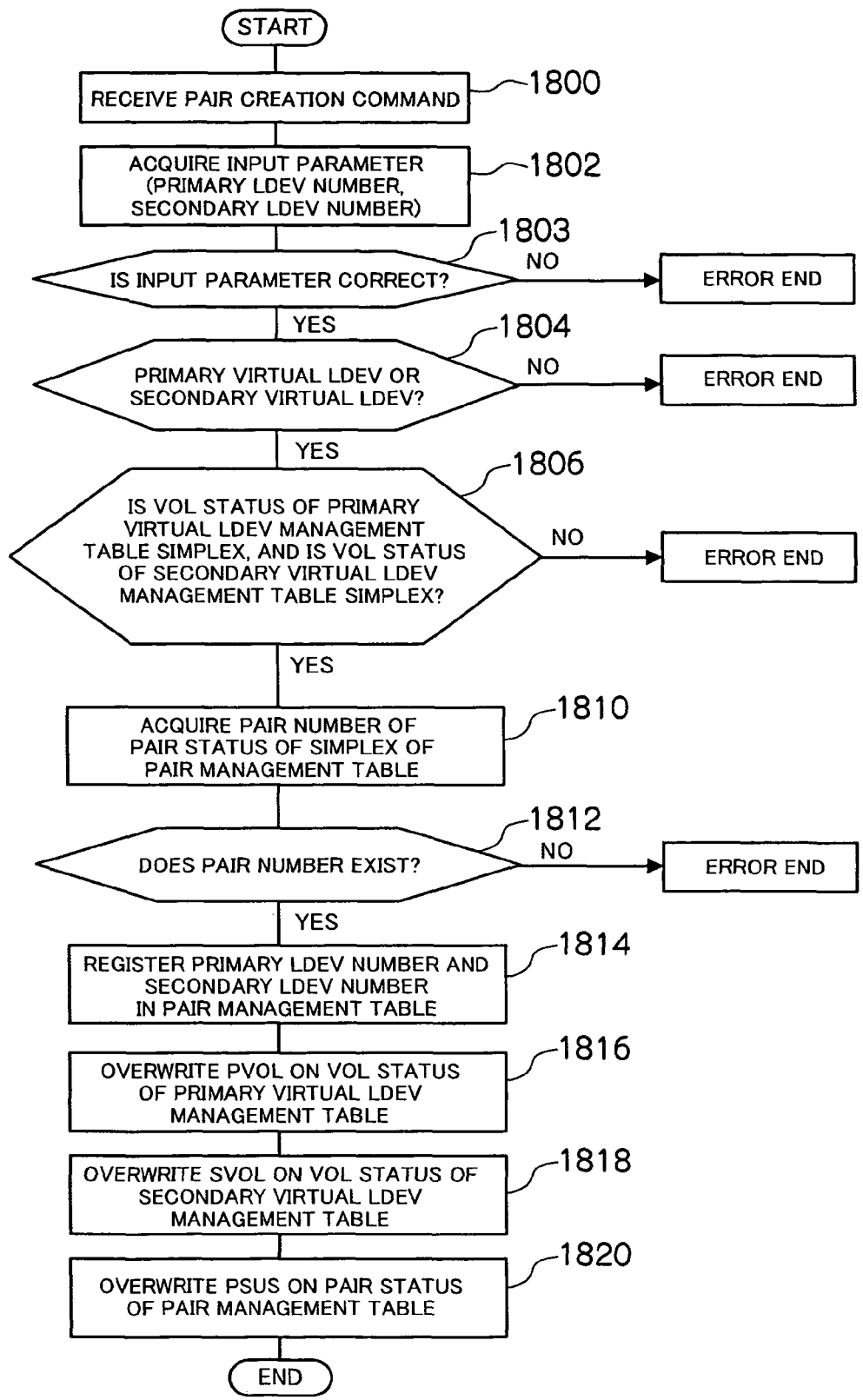
FIG. 18 is a flowchart for creating a pair between the primary volume and the secondary volume.

FIG. 18 is a flowchart explaining the operation of pair formation. The channel adapter receives a pair formation command from the management terminal or the host (1800), and acquires the input parameters (primary LDEV number, secondary LDEV) (1802). Subsequently, the channel controller determines whether the input parameters are correct (1803), whether the primary LDEV and the secondary LDEV are a virtual LDEV (1804), whether the VOL status of the primary virtual LDEV management table is SIMPLEX, and whether the VOL status of the secondary virtual LDEV management table is SIMPLEX (1806). Upon obtaining a negative determination, the channel controller ends the processing of this flowchart in error.

Subsequently, the channel adapter acquires the pair number of the pair status of SIMPLEX in the pair management table (1810), checks whether a pair number exists (1812), and error ends the processing when no pair number exists. When a pair number exists, the channel controller registers the primary LDEV number and the secondary LDEV number in the pair management table (1814), overwrites PVOL on the VOL status of the primary virtual LDEV management table (1816), overwrites SVOL on the VOL status of the secondary virtual LDEV management table (1818), overwrites PSUS on the pair status of the pair management table (1820), and thereby completes the pair formation for the re-key processing.

Figure 19:
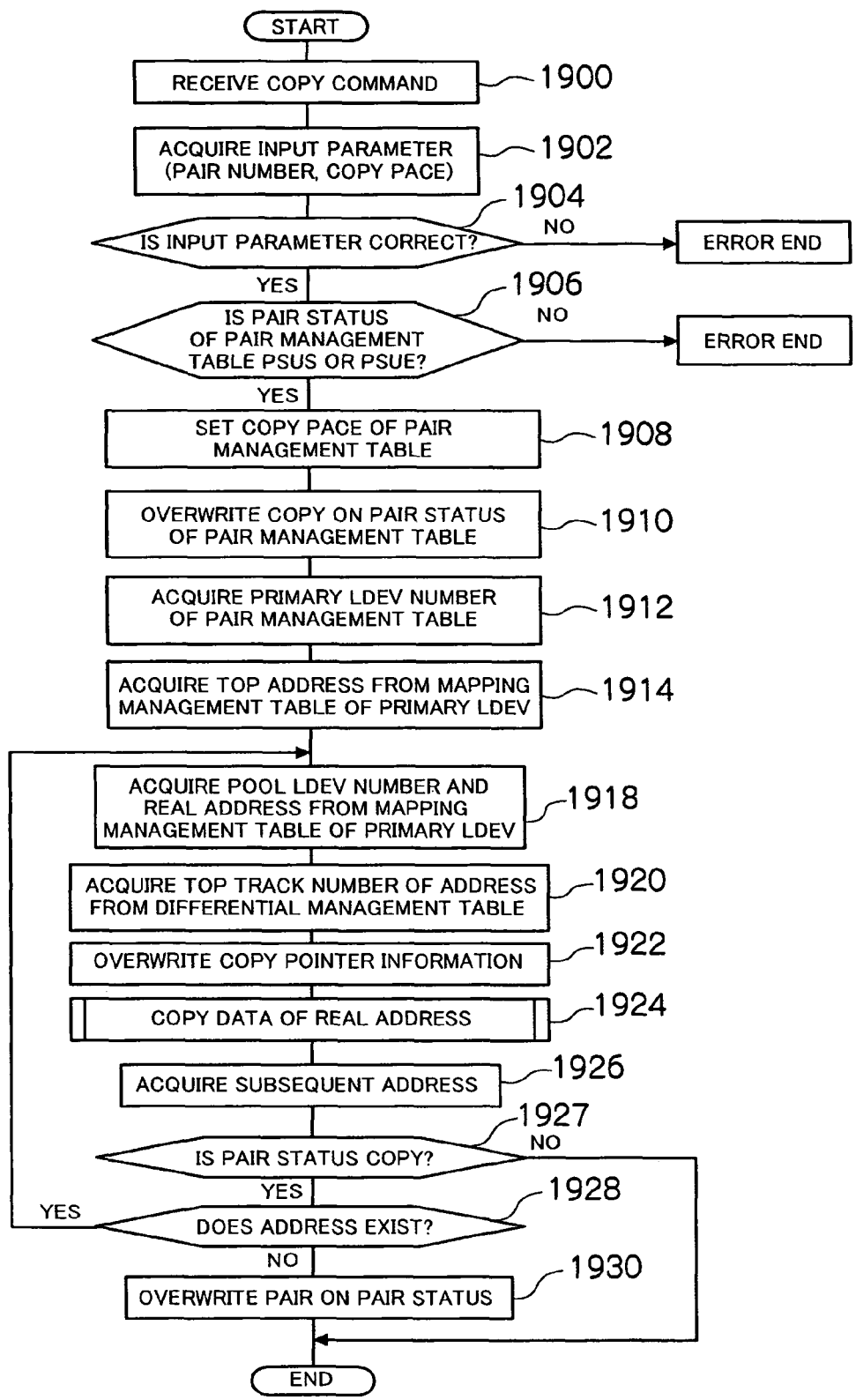
FIG. 19 is a flowchart explaining the copy processing of copying encrypted data from the primary volume to the secondary volume.

FIG. 19 is a flowchart showing the copy operation to be performed during re-key processing. When the channel controller receives a copy command (1900), it acquires the input parameters (pair number, copy pace) from the copy command (1902). Subsequently, the channel controller determines whether the input parameters are correct (1904), and ends the processing in error upon obtaining a negative determination. The channel controller further determines whether the pair status of the pair management table is PSUS or PSUE (1906), and ends the processing in error upon obtaining a negative determination.

The channel controller thereafter sets the copy pace of the pair management table (1908). Although the re-key processing will finish quickly if the copy pace is fast, this will burden the overall resources of the storage apparatus. The opposite will occur if the copy pace slow. The copy pace should be decided upon balancing the two.

The channel controller overwrites COPY on the pair status of the pair management table (1910), and acquires the primary LDEV number of the pair management table (1912). Further, the channel controller acquires the top address from the mapping management table of the primary LDEV (1914).

Subsequently, the channel controller acquires the pool LDEV number and the real address from the mapping management table of the primary LDEV (1918), and acquires the top track number of the address from the differential management table (1920). The channel controller thereafter overwrites the copy pointer information (1922). The channel controller copies the data of the real address of the primary volume to the secondary volume (1924), acquires the subsequent address, and determines whether the pair status is COPY (1927). For instance, when the copy is suspended during the copy, this is subject to a negative determination, and the flowchart is ended thereby. When this is subject to a positive determination, it is additionally determined whether an address exists (1928), and, when this is subject to a negative determination, PAIR is overwritten on the pair status. When this is subject to a positive determination, processing of step 1918 onward is continued for another address.

Figure 20:
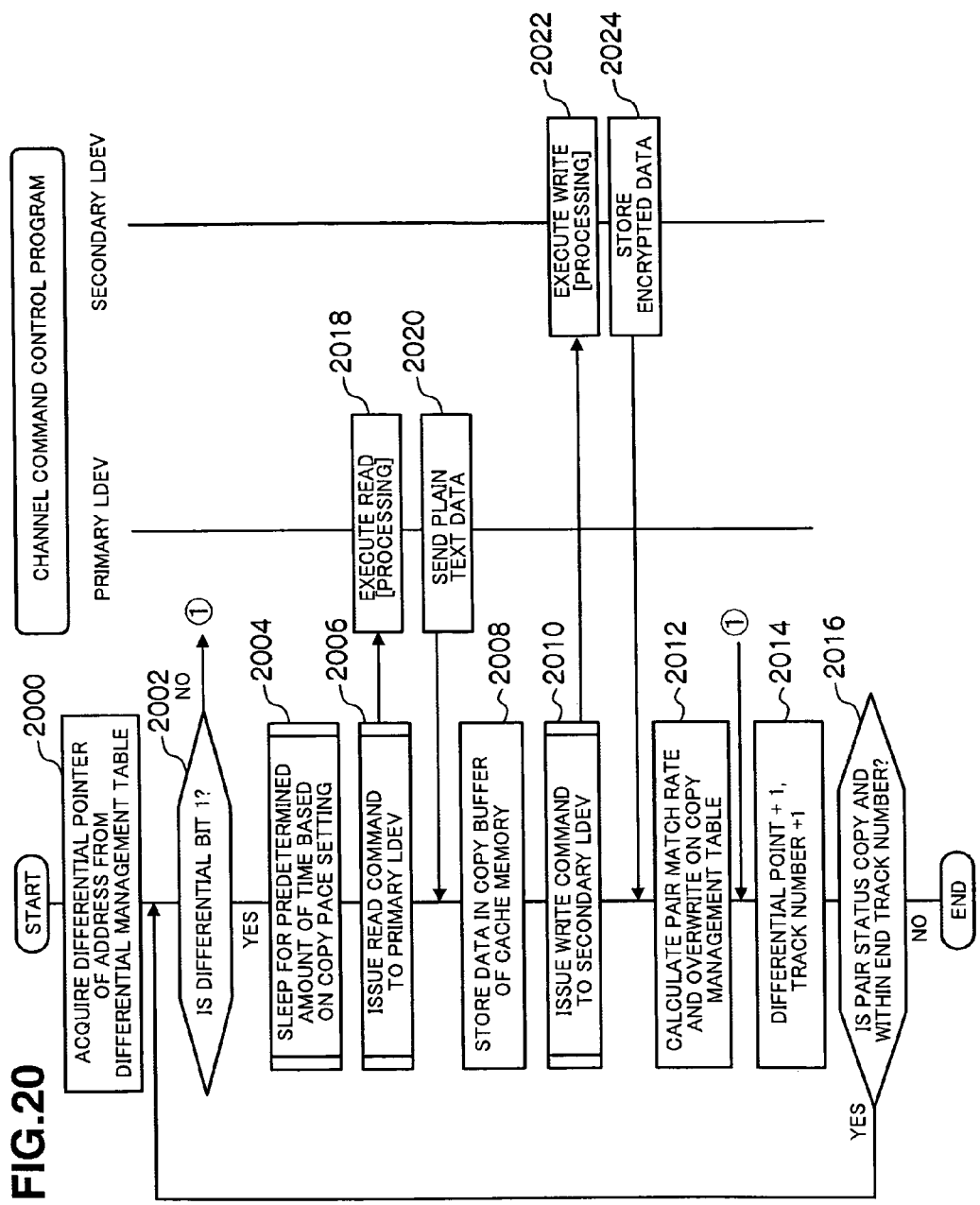
FIG. 20 is a flowchart showing the copy operation of a real address.

FIG. 20 is a flowchart showing the details of step 1924 of FIG. 19. The channel command control program acquires a differential pointer from the differential management table (2000), and checks whether the differential bit is "1" from the top of the differential pointer (2002). When the channel command control program obtains a negative determination, since the encrypted data of the track number has already been copied, it jumps to step 2014. Meanwhile, when the channel command control program obtains a positive determination, it issues a read command to the primary LDEV (2006), and stores the encrypted data in the secondary LDEV (2024).

The channel command control program reads the encrypted data of the primary LDEV, the encryption engine decrypts the encrypted data with an old key and sends the plain text to the cache memory (2020), and the channel command control program stores the plain text in the copy buffer of the cache memory (2008).

When the channel command control program issues a write command to the secondary LDEV, the disk controller executes write [processing] (2022), encrypts the plain text with a current key, and stores the encrypted text in the storage area of the secondary LDEV (2024). Incidentally, in the foregoing processing, since the storage apparatus performs copy operation at the copy pace set at step 2004, the I/O processing performance of the storage apparatus will not deteriorate.

The channel controller calculates the match rate of data between the pair formed from the secondary volume and the primary volume, and overwrites this on the copy management table (2013). The channel controller then increments the differential pointer and the track number, respectively (2014), and continues the processing of step 2002 onward until the pair status becomes COPY and the track number reaches the end number (2016).

Figure 21:
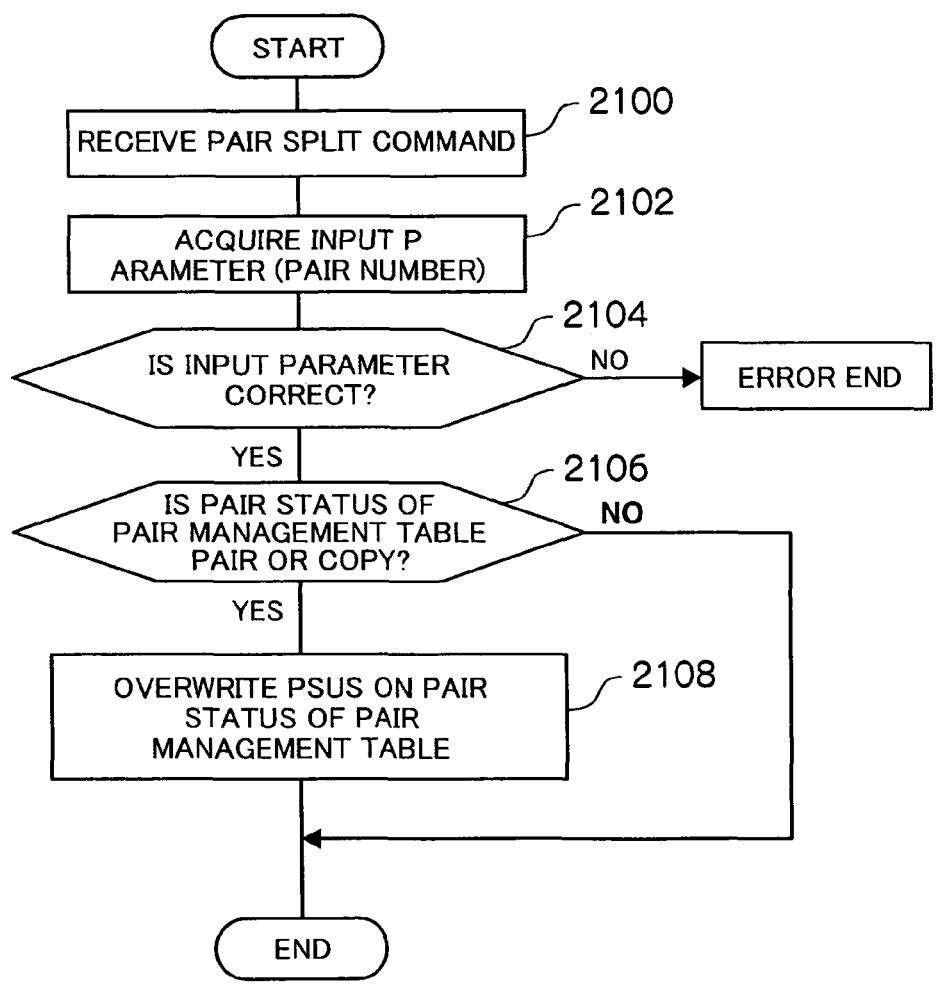
FIG. 21 is a flowchart showing the pair split processing.

FIG. 21 is a flowchart showing the flow of the pair split operation. The channel controller receives a pair split command (2100), and acquires the input parameter (pair number) (2102). The channel controller determines whether the input parameter is correct (2104), and ends the flowchart in error when the input parameter is incorrect.

When the input parameter is correct, the channel controller determines whether the pair status of the pair management table is PAIR or COPY (2106). When the channel controller obtains a positive determination, it overwrites PSUS on the pair status of the pair management table (2108). When the channel controller obtains a negative determination at step 2106, the channel controller ends the flowchart without performing step 2108.

Figure 22:
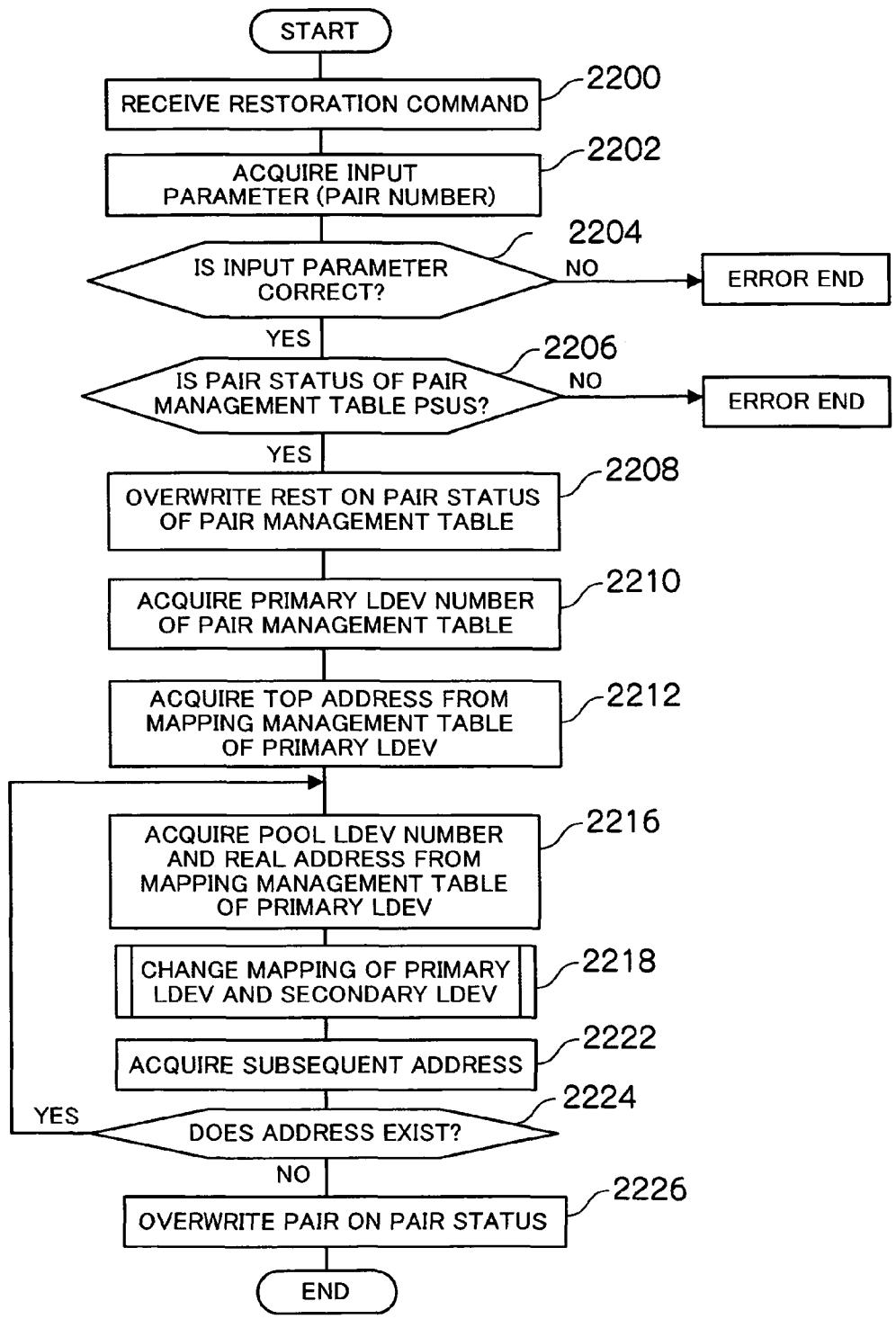
FIG. 22 is a flowchart explaining the restoration processing of encrypted data from the secondary volume to the primary volume.

FIG. 22 is a flowchart showing the restoration operation. When the channel controller receives a restoration command (2200), it acquires the input parameter (pair number) (2202). The channel controller thereafter checks whether the input parameter is correct (2204), and, upon obtaining a positive determination, determines whether the pair status of the pair management table is PSUS (2206). When the channel controller obtains a positive determination, it overwrites REST on the pair status of the pair management table (2208), and acquires the primary LDEV number of the pair management table (2210). Subsequently, the channel controller acquires the top address from the mapping management table of the primary LDEV (2212), acquires the pool LDEV number and the real address from the mapping management table of the primary LDEV (2216), and changes the mapping of the primary LDEV and the secondary LDEV (2218).

Upon acquiring the subsequent address (2222), the channel controller checks whether such subsequent address exists (2224). When a subsequent address exists, the channel controller returns to step 2216, and, when a subsequent address does not exist, it overwrites PAIR on the pair status.

Figure 23:
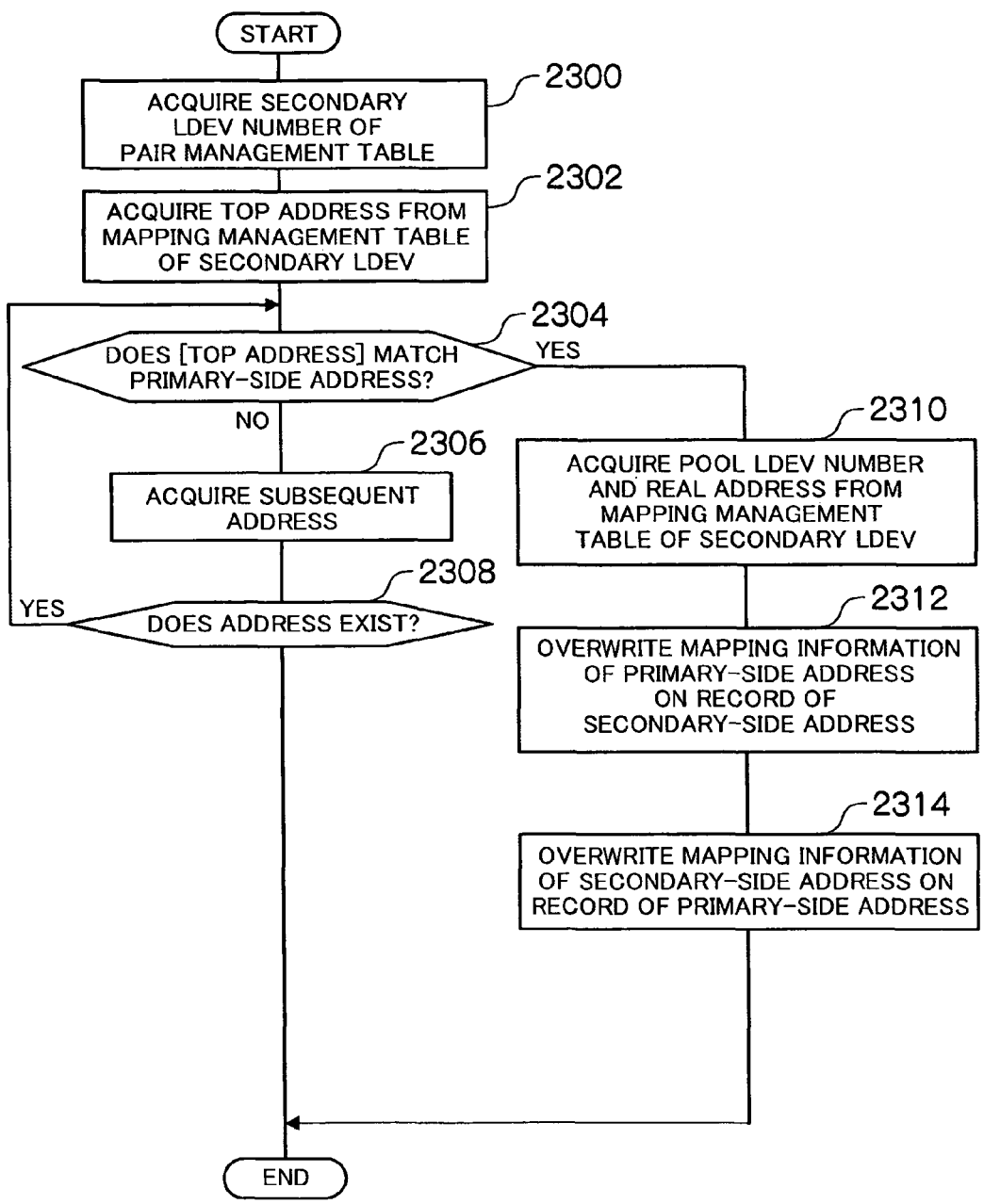
FIG. 23 is a flowchart explaining the processing for changing the mapping between the primary volume and the secondary volume during the restoration process.

FIG. 23 is a flowchart showing the details of step 2218 of FIG. 22. The channel controller acquires the secondary LDEV number of the pair management table (2300), and acquires the top address from the mapping management table of the secondary LDEV (2302). Subsequently, the channel controller determines whether such top address matches the address on the primary LDEV side, and proceeds to step 2306 and checks the subsequent address when there is no match, and proceeds to step 2304 when there is a match. When the channel controller obtains a positive determination at step 2304, it acquires the pool LDEV number and the real address from the mapping management table of the secondary LDEV (2310), overwrites the mapping information of the primary LDEV address on the record of the secondary-side address (2312), overwrites the mapping information of the secondary LDEV address on the record of the primary-side address (2314), and then ends this processing.

Figure 24:
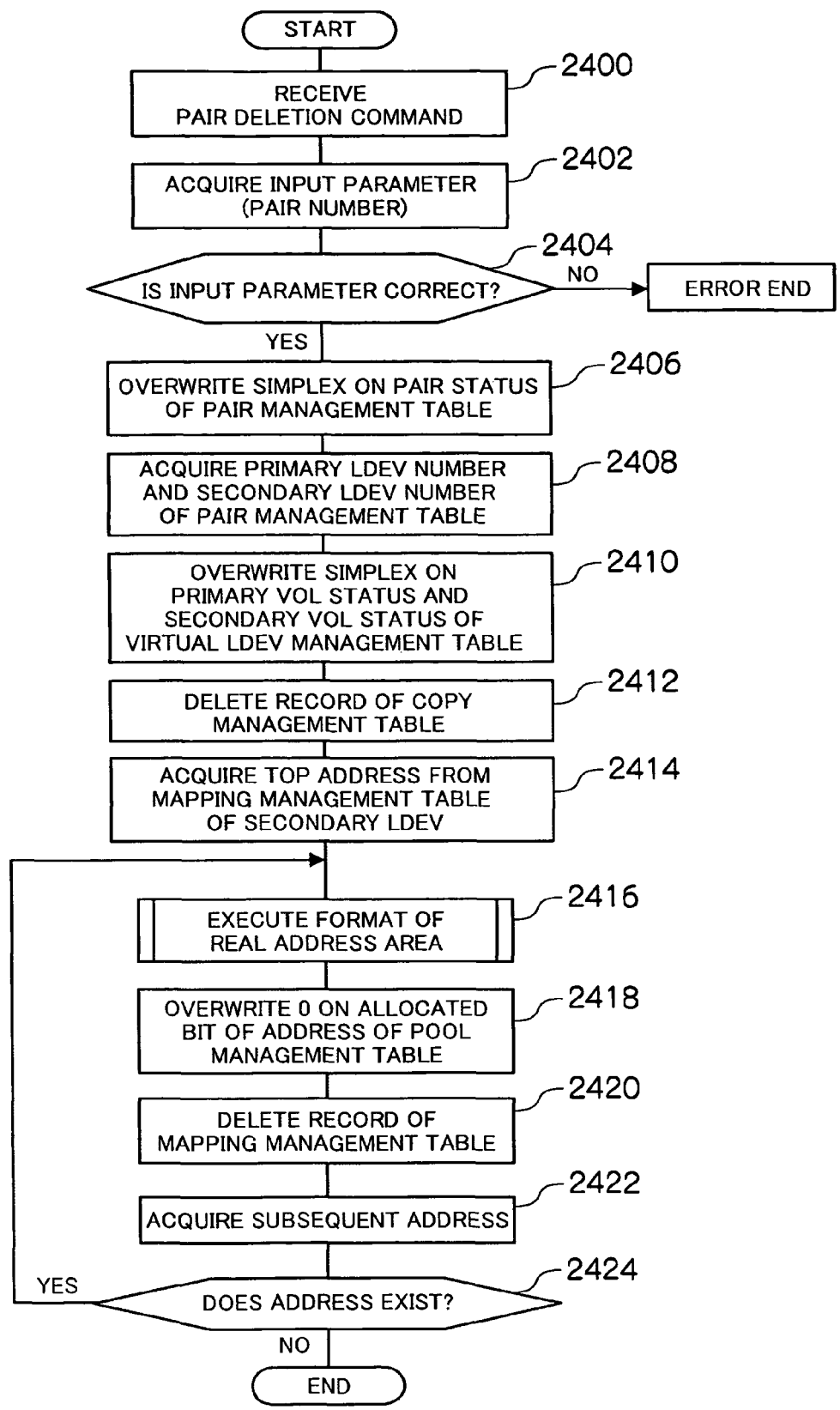
FIG. 24 is a flowchart explaining the processing for deleting a pair formed with the primary volume and the secondary volume.

FIG. 24 is a flowchart showing the flow of the pair deletion operation. The channel controller receives a pair deletion command from the management terminal or the host (2400), and acquires the input parameter (pair number) (2402). Subsequently, the channel controller checks whether the input parameter is correct (2404), and, upon obtaining a positive determination, it overwrites SIMPLEX on the pair status of the pair management table (2406).

Subsequently, the channel controller acquires the primary LDEV number and the secondary LDEV number of the pair management table (2408), and overwrites SIMPLEX on the primary VOL status and secondary VOL status of the virtual LDEV management table (2410). The channel controller then deletes the record of the copy management table (2412).

The channel controller thereafter acquires the top address from the mapping management table of the secondary LDEV (2414), formats the real address area of the secondary LDEV (2416), and overwrites 0 on the allocated bit of the pool management table (2418). Subsequently, the channel controller deletes the record of the mapping management table (2420). The channel controller thereafter acquires the subsequent address from the mapping management table of the secondary LDEV (2422), and executes step 2416 onward until there is no more subsequent address.

Figure 31:
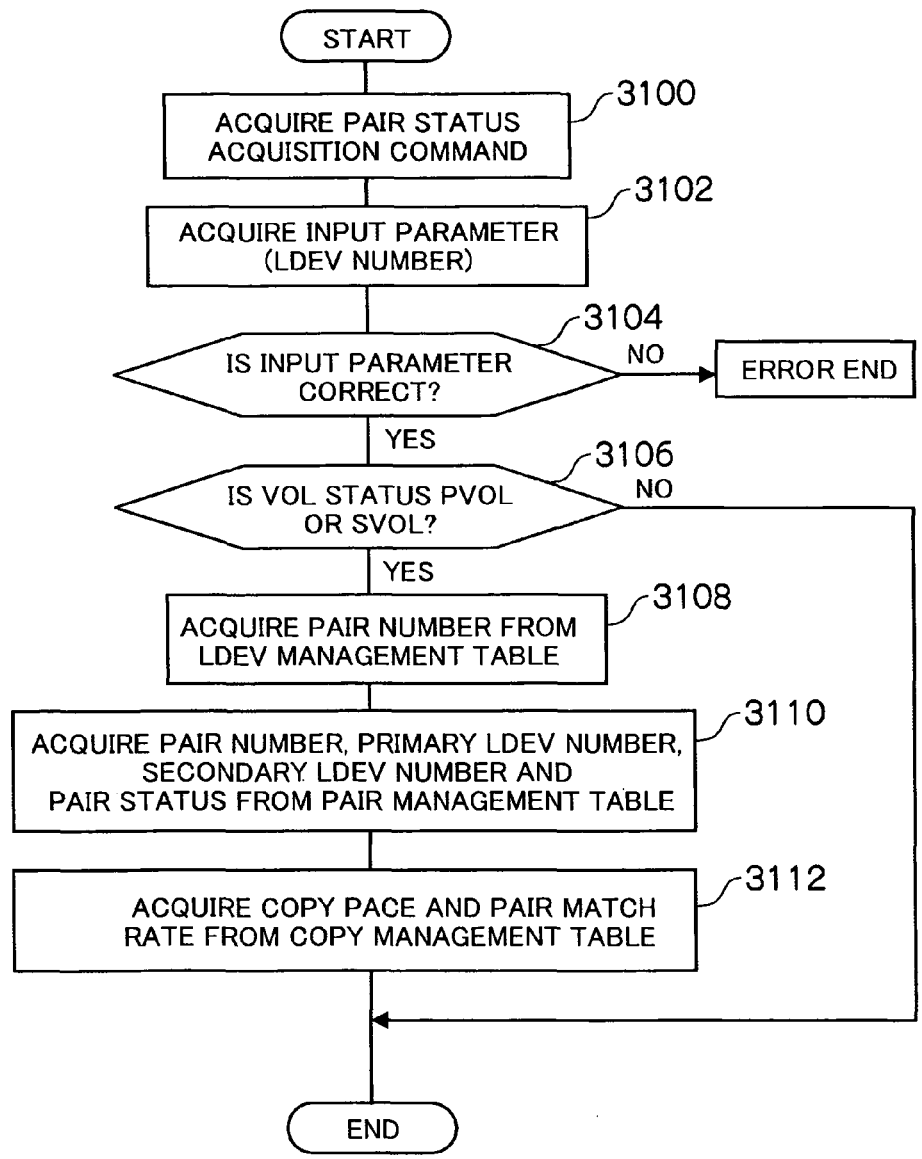
FIG. 31 is a flowchart for displaying the copy execution transition status based on FIG. 12A on a control terminal connected to the storage apparatus.

FIG. 31 is a flowchart for displaying the copy execution transition status based on FIG. 12A on the control terminal 30 connected to the storage apparatus. When the storage apparatus receives a pair status acquisition command from the control terminal (3100), it acquires the input parameter (LDEV number) from this command (3102). The DKC of the storage apparatus checks whether the input parameter is correct (3104), and, upon obtaining a positive determination, it checks whether the volume status is PVOL (primary volume) or SVOL (secondary volume) (3106).

When the volume status is PVOL or SVOL, the DKC acquires the pair number from the LDEV management table (3108). Subsequently, the DKC acquires the pair number, primary LDEV number, secondary LDEV number, and pair status from the pair management table (3110), acquires the copy pace and pair match rate from the copy management table, and sends these to the control terminal (3112).

Figure 32:
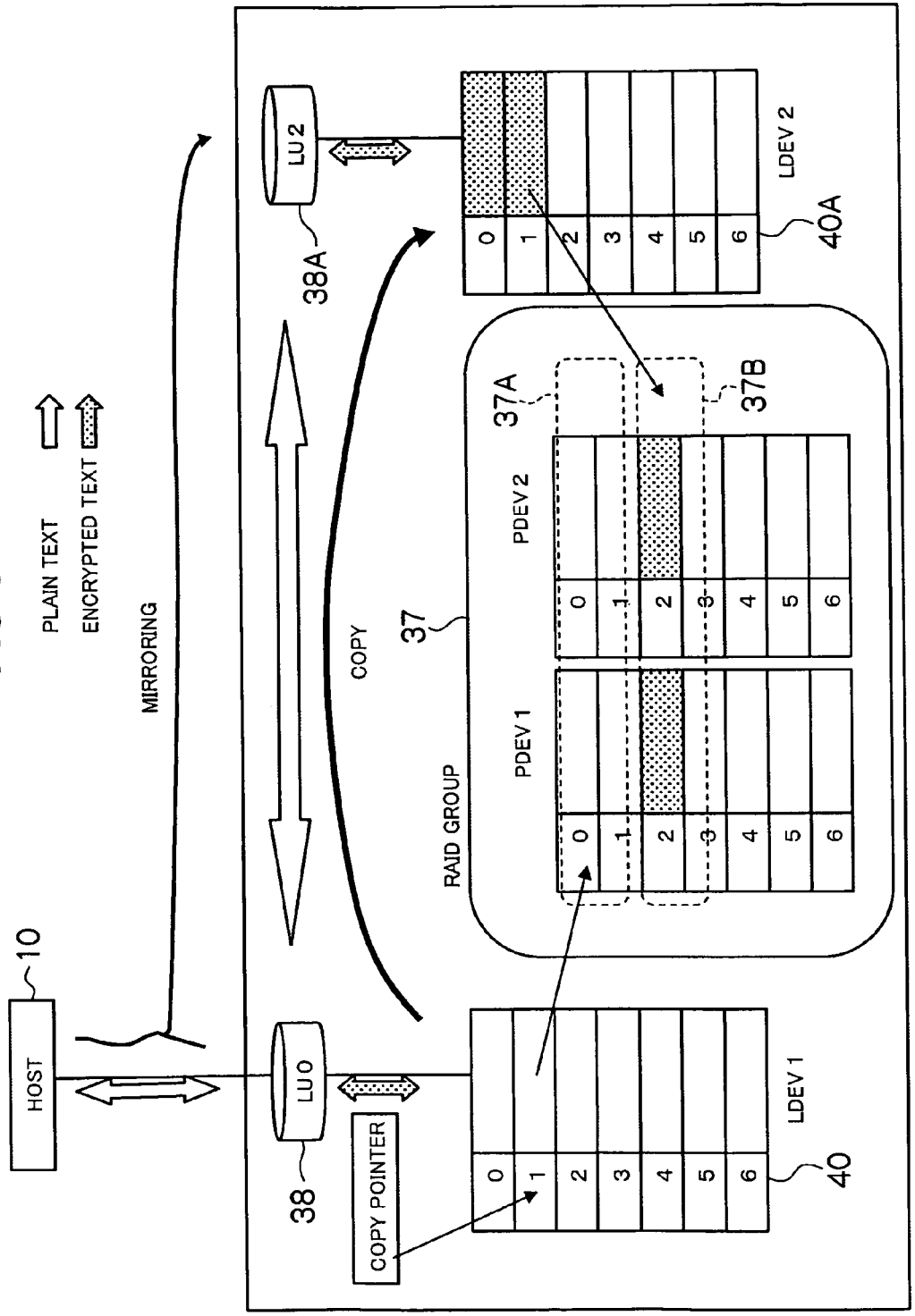
FIG. 32 is a block diagram showing the copy operation of encrypted data between a plurality of volumes pertaining to a modified example of the embodiment of FIG. 13.
Figure 33:
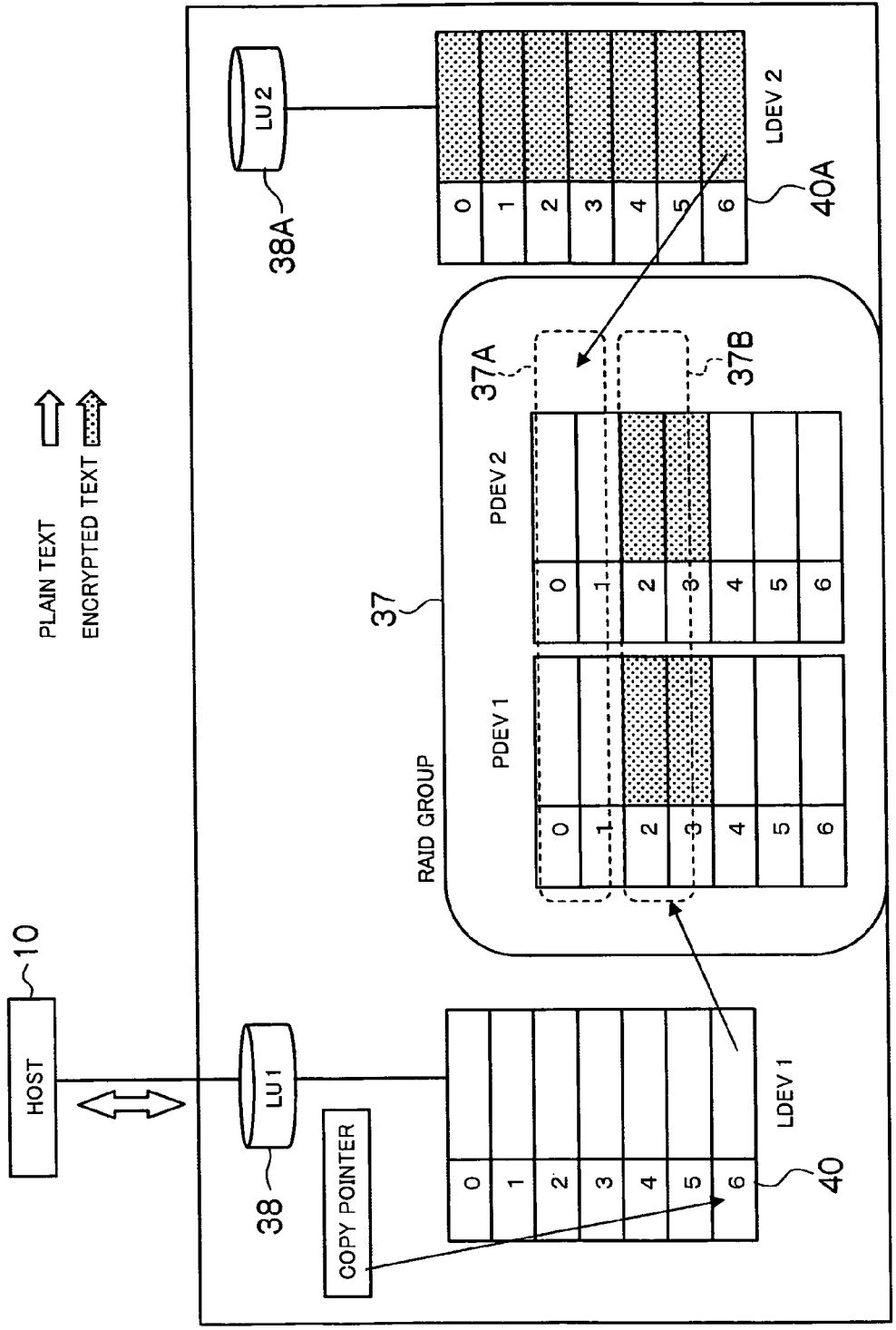
FIG. 33 is a block diagram showing the operation for restoring encrypted data to the primary volume pertaining to a modified example of the embodiment of FIG. 14.

FIG. 32 and FIG. 33 are modified examples of the embodiment shown in FIG. 13 and FIG. 14. FIG. 13 and FIG. 14 explained encrypted data conversion processing to be performed between the primary volume and the secondary virtual volume, whereas FIG. 32 and FIG. 33 describe an embodiment where the primary volume and the secondary volume are configured from real volumes.

As shown in FIG. 32, a RAID group 37A configured from a PDEV 1 and a PDEV 2 is mapped to the primary LDEV 40, and a RAID group 37B is mapped to the secondary LDEV 40A. In FIG. 32, the encrypted data conversion processing has advanced to the address of "1" of the primary volume and secondary volume as shown with the copy pointer.

When the encryption conversion processing proceeds to the end of the primary volume and the secondary volume, as described above, this means that the secondary volume has been restored to the primary volume, and FIG. 33 shows such restoration operation. The storage apparatus rewrites the control information of the mapping table, and exchanges the mapping information of the RAID group and volume of the primary volume and the secondary volume during restoration. Therefore, even without having to copy the re-encrypted data from the secondary volume to the primary volume, the primary volume will be able to deal with the data subject to encryption conversion with the new encryption key, and high-speed restore can be realized thereby.

Incidentally, in FIG. 32, write data from the host during the re-key processing is written in both the primary volume 40 and the secondary volume 40A. For example, even when the re-key processing is discontinued midway, since write data from the host is written in the secondary volume, data of the primary volume can be matched to the data of the secondary volume before restoration by restoring the secondary volume to the primary volume.

The write data from the host to the primary volume during the re-key processing is encrypted with an old encryption key or a new encryption key. When there is a write access to the primary volume, when the access-target differential bit is 0, the differential bit is changed to "1," and the foregoing copy is performed to the area corresponding to the bit. Simultaneously, the update bit is also changed to "1." The storage apparatus refers to this update bit, and, when the write data from the host has been encrypted with a new encryption key, it reads a new encryption key, and not an old encryption key, from the encryption management table, and decrypts the encrypted text stored in the track where the update bit is set to "1" using the new encryption key.

Here, the storage apparatus may also store the encrypted data of the track in the secondary volume without once decrypting such encrypted data. This is because the encrypted data has already been encrypted with the new encryption key. Meanwhile, encrypting the encrypted data stored in the primary volume with the same encryption key is also a convenient method.

Figure 34:
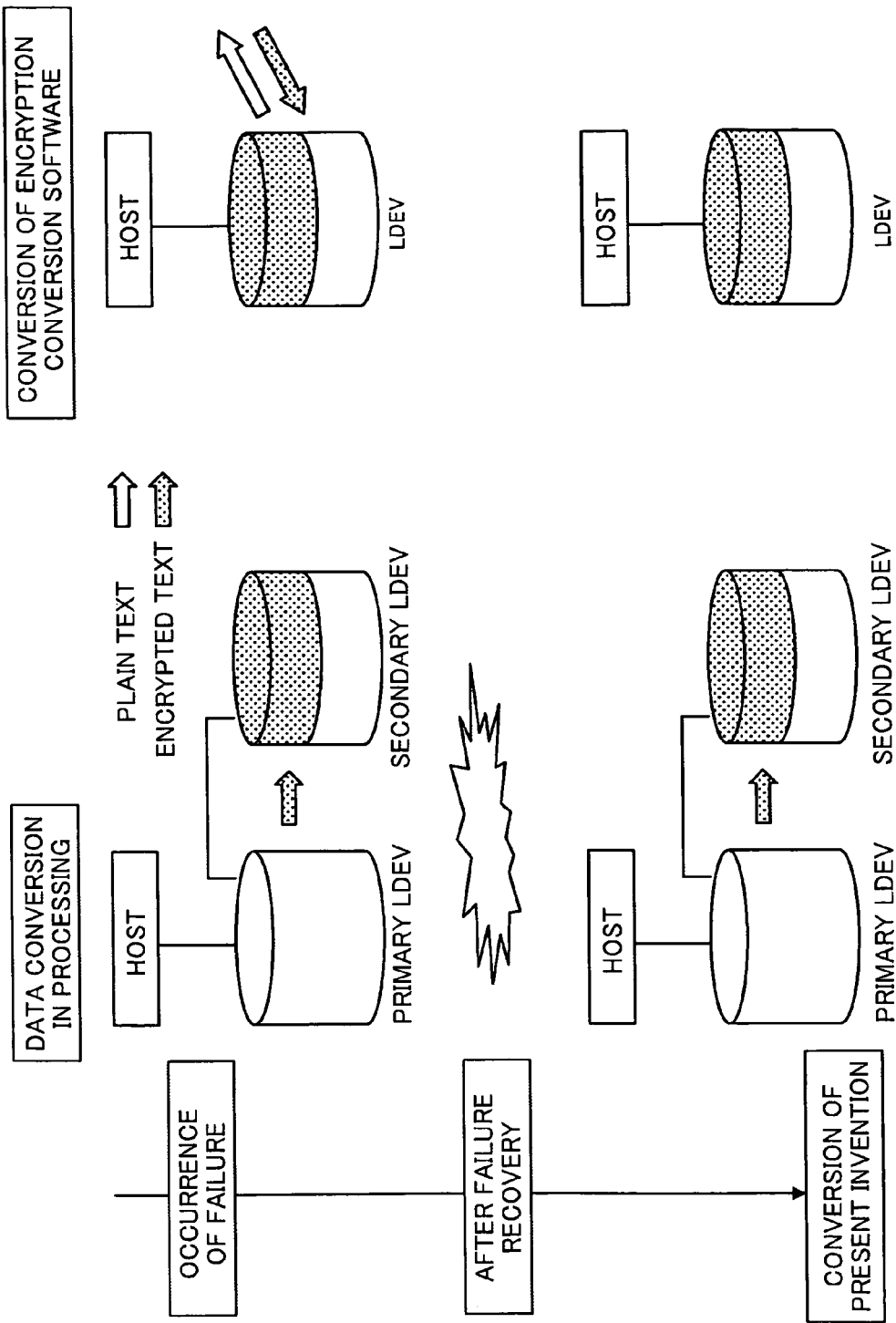
FIG. 34 is a block diagram explaining the difference between the re-key processing of the present invention and conventional re-key processing of encryption conversion software.

FIG. 34 is a block diagram explaining the difference between the re-key processing of the present invention and conventional re-key processing of encryption conversion software. When the storage apparatus system malfunctions due to a blackout or the like during the encryption conversion processing, with the conversion in the present invention, the encryption conversion processing simply needs to be re-performed regarding the primary LDEV after the system is recovered.

Contrarily, with the conventional method, it is necessary for the DKC to sequentially decrypt the encrypted data of the volume, encrypt such data with a new encryption key, and thereafter write such data in the volume. When the system malfunctions during this process, since data based on different encryption keys will coexist in the volume, the DKC will not be able to use the volume data.

Figure 35:
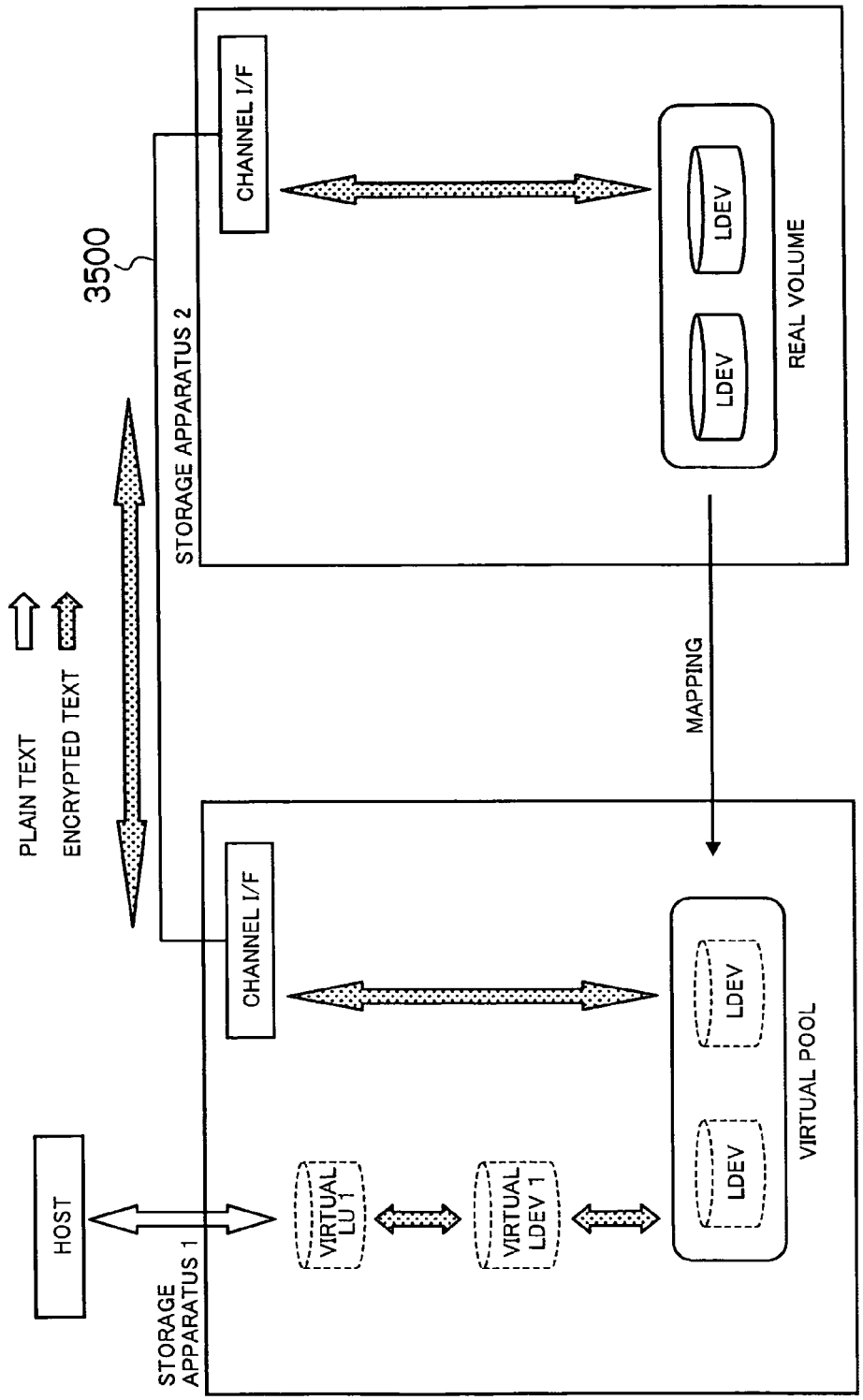
FIG. 35 is a block diagram showing a system where a real volume of a storage apparatus 2 is mapped to a storage apparatus 1.

FIG. 35 is a block diagram explaining another embodiment of the present invention. In this embodiment, a storage apparatus 2 (storage subsystem 2) is connected to a storage apparatus 1 (storage subsystem 1). The pool volume itself of the storage apparatus 1 is virtualized, and the real volume of the storage apparatus 2 is mapped thereto. Therefore, when the storage apparatus 1 encrypts the plain text from the host, it sends the encrypted text to the storage apparatus 2 via the line 3500, and the storage apparatus 2 writes the encrypted text in the real volume. When the host accesses the volume (virtual LDEV 1), the storage apparatus 1 reads the encrypted text from the real volume of the storage apparatus 2 via the storage apparatus 2.

Figure 36:
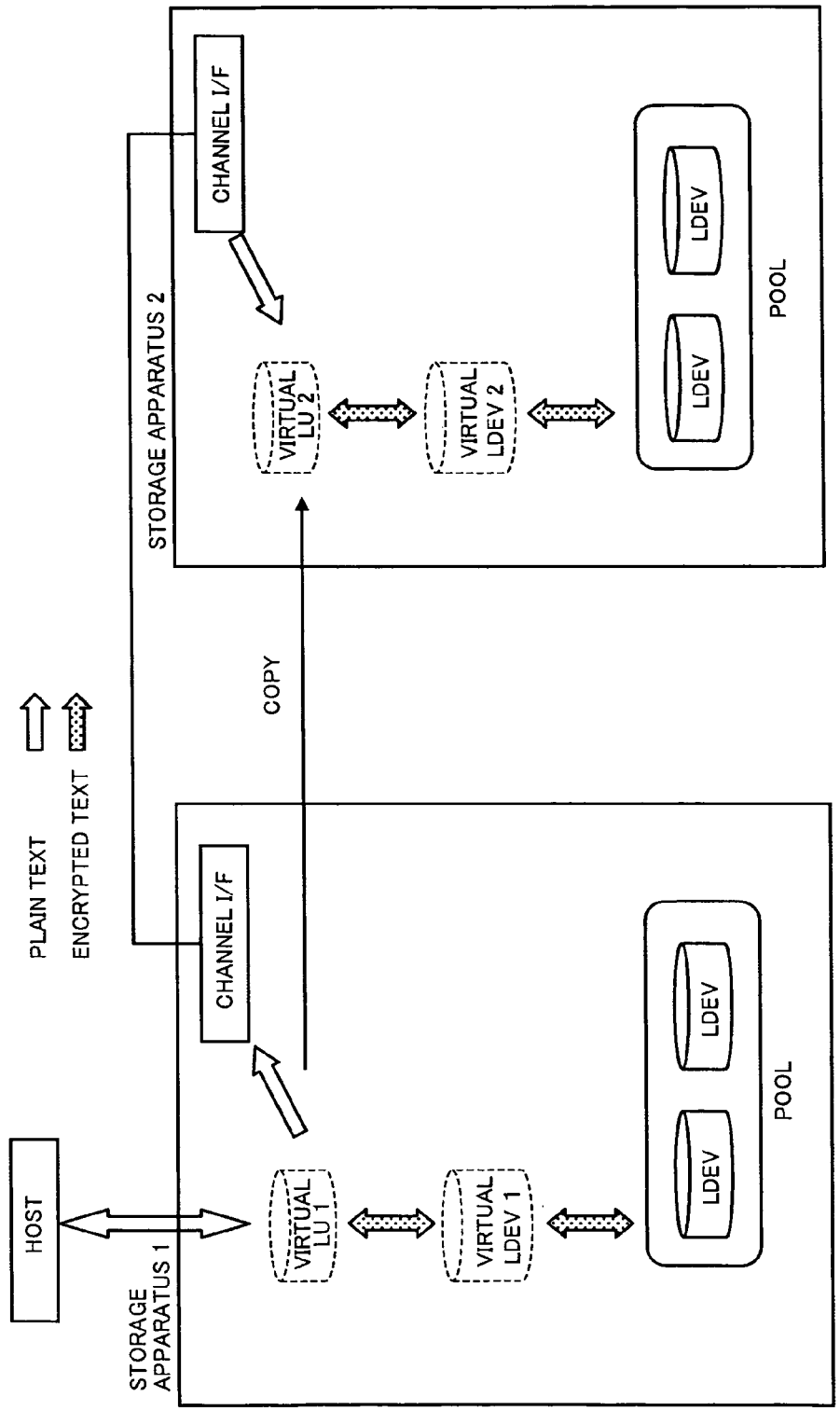
FIG. 36 is a block diagram showing a system where the storage apparatus 2 is connected to the storage apparatus 1 via remote copy.

FIG. 36 is a block diagram explaining yet another embodiment of the present invention. The storage apparatus 2 is connected to the storage apparatus 1 via remote copy. The plain text from the host is sent to the storage apparatus 2 from the storage apparatus 1, and the storage apparatus 2 encrypts the sent plain text and stores it in the real volume of the pool.

Although the foregoing embodiments explained a case of re-encrypting data, which was encrypted with an old encryption key, using a new encryption key in the primary volume, the present invention may also be applied to cases of encrypting the plain text stored in the primary volume using a first encryption key.

We claim:

1. A storage apparatus coupled to a host system and configured to control writing of data in response to a write command from said host system, and to control reading of data in response to a read command from said host system, the storage apparatus comprising:
   a cache memory;
   a first controller configured to control the writing of data in said cache memory pursuant to said write command;
   a second controller configured to control the writing of said data written in said cache into said storage devices; and
   an encryption engine configured to encrypt data pursuant to said write command;
   wherein said first controller is further configured to:
      provide a first virtual volume corresponding to a first virtual storage area in said storage devices, said first virtual storage area is allocated to a storage area from a pool and the allocation of said first virtual storage area is managed by first mapping information;
      control writing of first data in said first virtual storage area pursuant to a write command to said first virtual volume, wherein said first data comprises data encrypted using a first key according to said write command sent from said encryption engine to said first virtual volume; and
   execute re-key processing by:
      creating a copy pair with said first virtual volume and a second virtual volume;
      changing said first data read from said first storage area corresponding to said first virtual volume to second data obtained by decrypting said first data using said first key;
      further changing said second data to third data obtained by encrypting said second data by said encryption engine using a second key;
      establishing a correspondence relationship between a second virtual storage area in said storage devices and said second virtual volume, said second virtual storage area is allocated to a storage area from said pool and the allocation of said second virtual storage area is managed b second mapping information;
      controlling writing of said third data in said second virtual storage area;
      switching between said first mapping information and said second mapping information;
      releasing said first virtual storage area from said first virtual volume; and
      further releasing said second virtual storage area from said second virtual volume;
   such that data corresponding to said first virtual volume is changed from said first data corresponding to said first key to said third data corresponding to said second key.

2. The storage apparatus according to claim 1, wherein, when said second controller reads said encrypted data written in said storage devices and writes said encrypted data in said cache memory,
   said encryption engine decrypts said encrypted data;
   said decrypted data are written in said cache memory; and
   said first controller reads said decrypted data and outputs said decrypted data to said host system.

3. The storage apparatus according to claim 1, wherein said host system is configured to output a count key data (CKD) format frame to said first controller, and said encryption engine is configured to recognize a data portion from said CKD format frame and encrypt said data portion.

4. The storage apparatus according to claim 1, wherein, after write data from said host system are encrypted, said second controller creates a parity from said encrypted data, and said encrypted data and parity are distributed and stored in said storage devices according to a RAID configuration.

5. The storage apparatus according to claim 1, wherein said encryption engine is configured to encrypt a data portion without encrypting control information contained in a write access from said host system.

6. The storage apparatus of claim 1, wherein when the storage apparatus receives a write command with respect to the first virtual volume during the re-key processing, the storage apparatus stores data encrypted with the first key in the first storage area corresponding to the first virtual volume, and stores data decrypted with the second key in the second storage area corresponding to the second virtual volume.

7. The storage apparatus of claim 1, wherein when the storage apparatus receives a read command during the re-key processing, the storage apparatus decrypts, using the first key, the first data stored in the first storage area corresponding to the first virtual volume, and sends the decrypted first data to the host system.

8. A storage control method comprising:
   controlling, using a storage apparatus coupled to a host system, writing of data in response to a write command from said host system;
   controlling, using the storage apparatus, reading of data in response to a read command from said host system,
   wherein the storage apparatus comprises:
      a plurality of storage devices;
      a cache memory;
      a first controller;
      a second controller; and
      an encryption engine,
   the method further comprising the steps of:
   providing, using said storage devices, volumes to said host system, the volumes being managed as a pool;
   controlling, using the first controller, the writing of data in said cache memory pursuant to said write command;
   controlling, using the second controller, the writing of said data written in said cache into said storage devices;
   encrypting, using the encryption engine, data pursuant to said write command;
   providing, using the first controller, a first virtual volume corresponding to a first virtual storage area in said storage devices, said first virtual storage area being allocated a storage area from said pool and the allocation of said first virtual storage area being managed by first mapping information;
   controlling, using the first controller, writing of first data in said first virtual storage area pursuant to a write command to said first virtual volume, wherein said first data include data encrypted using a first key according to said write command sent from said encryption engine to said first virtual volume; and
   executing, using said first controller, re-key processing by:
      creating a copy pair with said first virtual volume and a second virtual volume;
      changing said first data read from said first storage area corresponding to said first virtual volume to second data obtained by decrypting said first data using said first key;
      further changing said second data to third data obtained by encrypting said second data by said encryption engine using a second key;
      establishing a correspondence relationship between a second virtual storage area in said storage devices and said second virtual volume, said second virtual storage area being allocated a storage area from said pool and the allocation of said second virtual storage area being managed by second mapping information;

controlling the writing of said third data in the second storage area;

switching between said first mapping information and said second mapping information;

releasing said first virtual storage area from said first virtual volume; and further releasing said second virtual storage area from said second virtual volume, such that data corresponding to said first virtual volume is changed from said first data corresponding to said first key to said third data corresponding to said second key.

9. The method of claim 8, wherein when the storage apparatus receives a write command with respect to the first virtual volume during the re-key processing, the method further comprises:

storing, using the storage apparatus, data encrypted with the first key in the first storage area corresponding to the first virtual volume; and storing, using the storage apparatus, data decrypted with the second key in the second storage area corresponding to the second virtual volume.

10. The method of claim 8, wherein when the storage apparatus receives a read command during the re-key processing, the method further comprises:

decrypting, using the storage apparatus with the first key, the first data stored in the first storage area corresponding to the first virtual volume; and sending the decrypted first data to the host system.

11. The method of claim 8, wherein when said second controller reads said encrypted data written in said storage devices and writes said encrypted data in said cache memory, the method further comprises:

decrypting, using said encryption engine, said encrypted data;

writing said decrypted data in said cache memory; and reading, using said first controller, said decrypted data and outputting said decrypted data to said host system.

12. The method of claim 8, further comprising:

outputting, from said host system, a count key data (CKD) format frame to said first controller;

recognizing, using said encryption engine, a data portion from said CKD format frame; and encrypting said data portion.

13. The method of claim 8, further comprising, after write data from said host system are encrypted, creating, using said second controller, a parity from said encrypted data, wherein said encrypted data and parity are distributed and stored in said storage devices according to a RAID configuration.

14. The method of claim 8, further comprising encrypting, using said encryption engine, a data portion without encrypting control information contained in a write access from said host system.

\* \* \* \* \*

UNITED STATES PATENT AND TRADEMARK OFFICE
CERTIFICATE OF CORRECTION

| | |
|---|---|
| PATENT NO. | : 8,438,403 B2 |
| APPLICATION NO. | : 12/010357 |
| DATED | : May 7, 2013 |
| INVENTOR(S) | : Kasako et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1218 days.

Signed and Sealed this
Sixth Day of January, 2015

Michelle K. Lee
*Deputy Director of the United States Patent and Trademark Office*